US009721286B2

(12) United States Patent
Harris

(10) Patent No.: US 9,721,286 B2
(45) Date of Patent: *Aug. 1, 2017

(54) SYSTEM AND METHOD FOR TRACKING PURCHASES

(71) Applicant: David N. Harris, Sonora, CA (US)

(72) Inventor: David N. Harris, Sonora, CA (US)

(73) Assignee: HARRIS INTELLECTUAL PROPERTY, LP, Sonora, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/735,559

(22) Filed: Jan. 7, 2013

(65) Prior Publication Data

US 2013/0132205 A1    May 23, 2013

Related U.S. Application Data

(63) Continuation of application No. 12/460,527, filed on Jul. 21, 2009, now Pat. No. 8,352,327.

(51) Int. Cl.
*G06Q 30/00* (2012.01)
*G06Q 30/06* (2012.01)
(Continued)

(52) U.S. Cl.
CPC ......... *G06Q 30/0625* (2013.01); *G06Q 20/04* (2013.01); *G06Q 20/10* (2013.01);
(Continued)

(58) Field of Classification Search
CPC ................... G06Q 30/0601–30/0643
(Continued)

(56) References Cited

U.S. PATENT DOCUMENTS 6,782,370 B1    8/2004 Stack
7,899,823 B1 *  3/2011 Trandal et al. ............... 707/736
(Continued)

OTHER PUBLICATIONS

"allEtronic Helps Save Over 9 Million Trees Per Year By Delivering Receipts To In-Store Customers Digitally". May 29, 2008. Business Wire.*
(Continued)

*Primary Examiner* — William Allen
(74) *Attorney, Agent, or Firm* — Larry E. Henneman, Jr.; Gregory P. Gibson; Henneman & Associates, PLC

(57) ABSTRACT

A novel method for obtaining transaction information includes receiving a first transaction record including data indicative of one or more products purchased by a first purchaser from a first merchant, storing the data included in the first record, receiving a second transaction record including electronic data indicative of one or more products purchased by the purchaser from a second merchant, storing the data included in the second record, and providing the first purchaser access to the first transaction record and the said second transaction record. The method is performed on a handheld device which is carried by the first purchaser. A point-of-sale system is also disclosed and includes: a processing, a product interface operative to receive product data, memory operative to store a first transaction record, and a transaction record interface operative to output electronic data indicative of the first transaction record.

27 Claims, 13 Drawing Sheets

(51) Int. Cl.
   *G06Q 20/04* (2012.01)
   *G06Q 20/10* (2012.01)
   *G06Q 20/12* (2012.01)
   *G06Q 20/20* (2012.01)
   *G06Q 20/32* (2012.01)
   *G06Q 30/02* (2012.01)

(52) U.S. Cl.
   CPC ............ *G06Q 20/12* (2013.01); *G06Q 20/20* (2013.01); *G06Q 20/202* (2013.01); *G06Q 20/204* (2013.01); *G06Q 20/32* (2013.01); *G06Q 20/3221* (2013.01); *G06Q 20/3223* (2013.01); *G06Q 30/02* (2013.01); *G06Q 30/0253* (2013.01); *G06Q 30/0255* (2013.01); *G06Q 30/0601* (2013.01); *G06Q 30/0641* (2013.01)

(58) Field of Classification Search
   USPC .............................................. 705/26.1–27.2
   See application file for complete search history.

(56) References Cited

U.S. PATENT DOCUMENTS

| | | | |
|---|---|---|---|
| 8,352,327 B2* | 1/2013 | Harris .......................... | 705/26.1 |
| 8,438,052 B1* | 5/2013 | Chanda et al. ............... | 705/7.11 |
| 2002/0072974 A1* | 6/2002 | Pugliese et al. ................ | 705/14 |
| 2009/0094118 A1* | 4/2009 | Antonucci et al. ............. | 705/14 |
| 2009/0313101 A1* | 12/2009 | McKenna .......... | G06Q 10/0637 |
| | | | 705/14.25 |
| 2010/0070343 A1* | 3/2010 | Taira .................... | G06Q 10/067 |
| | | | 705/400 |
| 2011/0060664 A1* | 3/2011 | Bezos .................... | G06Q 30/00 |
| | | | 705/27.1 |
| 2011/0238478 A1* | 9/2011 | Gottfurcht et al. ........ | 705/14.25 |

OTHER PUBLICATIONS

CA Patent Application No. 2,768,619, Office Action dated Jan. 10, 2017.
AU Patent Application No. 2010275005, Office Action dated Oct. 26, 2015.

* cited by examiner

SYSTEM AND METHOD FOR TRACKING PURCHASES

RELATED APPLICATIONS

This application is a continuation of U.S. patent application Ser. No. 12/460,527 (now U.S. Pat. No. 8,352,327) filed on Jul. 21, 2009 by the same inventor, which is incorporated herein by reference in its entirety.

BACKGROUND OF THE INVENTION

Field of the Invention

This invention relates generally to electronic commerce, and more particularly to a system and method for tracking purchases made by one or more purchasers. Even more particularly, the present invention relates to tracking specific products purchased by one or more purchasers and the prices paid for those products.

Description of the Background Art

Electronic commerce, buying and selling by electronic means, has become commonplace in modern society. With the mainstreaming of the Internet (most specifically the World Wide Web), electronic commerce has made its way into the home or office of any person with a computer. The mainstreaming of the Internet has also allowed purchasers (e.g., credit card users, bank account holders, savings account holders, etc.) to manage and monitor their spending from home by enabling purchasers to view past transaction records via a website provided by their account providers (e.g., credit card company, bank, etc.).

In a typical transaction, the purchaser presents a merchant with a product, optionally labeled with a product identifier, and an account identifier (e.g., credit card, debit card, etc.). The product identifier, typically in the form of a SKU (stock-keeping unit) attached to a product, provides the merchant with product information such as price, inventory, etc. The account identifier provides the merchant with information which identifies the purchaser and account held by the purchaser. The merchant then processes the card using an electronic POS (point-of-sale) system (e.g., credit card payment terminal, debit terminal, etc.) with a communications link to the merchant's acquiring bank. The POS system authorizes the transaction by identifying the account provider and sending out an electronic TAR (transaction approval request). The account provider then returns either an approval or denial, depending on the purchaser's current account status. If the transaction is approved, the POS system proceeds with the transaction by sending general transaction information to the account provider and providing the purchaser with a paper receipt. The purchaser can then manage their account by manually keeping records of paper receipts and/or by viewing their records through the website provided by their account provider. It is important to note that the term product, as used herein, refers to any purchasable good or service.

Although the ability to view account transaction records online provides several convenient advantages, there are still some disadvantages. For example, transaction information is not typically made available by the account provider until after the account provider transmits funds to the merchant's bank, which can sometimes take several days. Therefore, the purchaser has to manually keep track of past transaction information, through paper receipts, in order to accurately monitor their account. As another example, the transaction information that the account providers typically receive includes data indicative of merchant identification, transaction data, transaction cost, and only a generic description, at best, of the product(s) or service(s) (e.g., groceries, vehicle service, etc.). In some cases the information can actually be misleading. For example, a food purchase from service station might appear to be a fuel purchase. The account providers do not receive and, therefore, cannot provide purchasers with detailed product descriptions, which makes it difficult or impossible for purchasers to effectively use the product information for much more than simply identifying the transaction. Of course, no information is provided to the account providers for cash transactions. Therefore, cash purchasers have no choice but to manually log all transaction information in order to accurately monitor spending.

Known POS systems also suffer from some separate disadvantages. For example, it is inconvenient and costly for merchants to provide a printed receipt for every transaction. There are costs associated with paper, supplies, and receipt printer maintenance. Moreover, many of the printed receipts are simply thrown on the floor or in the parking lot by customers, thus requiring resources to keep them cleaned up.

Some merchants, namely Internet merchants, conduct trade remotely and provide purchasers with a digital receipt, via email or a link to a webpage, displaying detailed information associated with the purchased products. Although some remote merchants generally provide more specific product information on digital receipts, several disadvantages still exist. For example, the product information that remote merchants transmit to the purchaser's account provider still only includes very general information, as described above. The detailed information is still only available on the merchant's system. Therefore, keeping specific records of products purchased from several different remote merchants would be just as inconvenient as keeping records of products purchased from several different local merchants, because both require the purchaser to manually keep track of specific product information. In either case, the account provider still receives only, at best, a very general description of the purchased products.

What is needed, therefore, is a system and method for conveniently tracking specific transaction details. What is also needed is a system and method for conveniently providing purchasers with more specific transaction information. What is also needed is a more convenient system and method for locally providing and receiving more specific transaction information. What is also needed is a system and method that eliminates the need for paper receipts.

SUMMARY

The present invention overcomes the problems associated with the prior art by providing a system and method for tracking purchases. The invention facilitates the accumulation and storage of a user's purchases and the provision of services to the user based on those purchases. In addition, services can be provided to the user based on the stored transactions of many users.

In an example embodiment, a system for obtaining transaction information includes a processing unit, operative to process data and code, and a transaction record interface. The transaction record interface is operative to receive a first transaction record, including data indicative of one or more products purchased by a first purchaser from a first merchant, and a second transaction record, including data indicative of one or more products purchased by the first purchaser from a second merchant. The system further includes memory operative to store the first transaction record and the second transaction record and a purchaser interface operative to provide the first purchaser access to the first and second transaction records.

The transaction record interface is further operative to receive a third transaction record, including data indicative of one or more products purchased by a second purchaser from a third merchant, and a fourth transaction record, including data indicative of one or more products purchased by the second purchaser from a fourth merchant. The memory stores the third and fourth transaction records, and the purchaser interface provides the second purchaser access to the third and fourth transaction records.

In an example embodiment, the first transaction record and the second transaction record include data indicative of the first purchaser, and the third transaction record and the fourth transaction record include data indicative of the second purchaser. The transaction records are received, for example, from various point-of-sale systems. In particular, the transaction record interface receives the first transaction record from a first point-of-sale system employed by the first merchant, receives the second transaction record from a second point-of-sale system employed by the second merchant, receives the third transaction record from a third point-of-sale system employed by the third merchant, and receives the fourth transaction record from a fourth point-of-sale system employed by said fourth merchant.

Optionally, the transaction record interface receives the first transaction record and the second transaction record from the first purchaser and receives the third transaction record and the fourth transaction record from the second purchaser.

As another option, the transaction record interface receives the first transaction record and the second transaction record from a first account provider and receives the third transaction record and the fourth transaction record from a second account provider. The account providers are, for example, financial institutions that provide the purchasers with accounts (e.g., credit card accounts, banks, etc.) that fund the transactions.

A system according to the present invention can be hosted by a third-party purchase tracking service provider. The third-party service provider system provides services to the first purchaser based on at least one transaction record associated with the first purchaser. The system also provides services to the second purchaser based on at least one transaction record associated with the second purchaser. The third-party service provider system hosts web-based services via an interactive website. The web-based services are accessible to the first purchaser and the second purchaser through the purchaser interface. Optionally, the purchase tracking system can be hosted by a financial account provider.

The third-party service provider optionally facilitates targeted advertising. The system includes an advertisement source interface, memory, an advertisement selection routine, and an advertisement display routine. The advertisement source interface is operative to receive advertisements provided by an advertisement source. The memory is operative to store the advertisements and to store transaction information provided by a purchaser. The advertisement selection routine is operative to select an advertisement based on information provided by the purchaser via the purchaser interface, and the advertisement display routine is operative to display the selected advertisement to the purchaser when the purchaser connects to the website. Optionally, the transaction information can be provided to the third-party system by merchants, financiers, or other sources, as described in connection with various example embodiments disclosed herein. Optionally, the transaction information and/or the advertisements are stored in a relational database.

The disclosed example systems include a product information interface operative to receive product information (e.g., safety recalls, etc.) provided by a product information source. This facilitates the provision of services to the purchasers based on the product information.

According to another disclosed example, a transaction record interface is included in a mobile handheld device. The mobile handheld device includes a receiver operative to wirelessly receive transaction records from, for example, a point of sale system. The wireless receiver is a short-range wireless receiver and is optionally included in a short-range wireless transceiver operative to facilitate local communication between the mobile handheld device and various point-of-sale systems. The mobile handheld device further includes a communication interface operative to facilitate data communication between the handheld device and an external system. Examples of the external system include, but are not limited to, a personal computer, an internetwork, a financial account provider system, and a third-party purchase tracking service provider. Thus, transaction records can be indirectly transferred from point-of-sale systems to a purchase tracking database, by the purchaser.

An inventive point-of-sale system is also disclosed that facilitates a transaction between a purchaser and a merchant using the point of sale system. The point-of-sale system includes a processing unit operative to process data and code, a product interface operative to receive product data indicative of a product, memory operative to store a transaction record, and a transaction record interface. The transaction record includes data indicative of the product. The transaction record interface is operative to provide electronic data indicative of the transaction record to the purchaser. In one example, the transaction record interface includes a wired connection to a device of the purchaser. In another example, the point-of-sale system includes a wireless transmitter (e.g., a short range wireless communication device) operative to transmit a wireless signal indicative of the transaction record to a device (e.g., a handheld device) of the purchaser.

Optionally, the point-of-sale system includes a purchaser interface that is further operative to receive electronic data provided locally by the purchaser. For example, the purchaser can interact with the purchaser interface via the purchaser's mobile handheld device. The electronic data provided by the mobile handheld device optionally includes data indicative of the purchaser. A transaction record routine associates the purchaser data with purchased product data, so that the transaction record includes data indicative of the purchaser and the product.

As another option, transaction record interface of the point-of-sale system is operative to transmit the transaction record to a system of a financial account provider. Examples of financial account providers include, but are not limited to, credit card companies and banks. As yet another option, the transaction record interface is operative to output the transaction record to a third-party purchase tracking service provider system.

Methods for obtaining transaction information are also disclosed. An example method includes receiving a first transaction record including electronic data indicative of one or more products purchased by a first purchaser from a first merchant, storing the data indicative of one or more products purchased by the first purchaser from the first merchant, receiving a second transaction record including electronic data indicative of one or more products purchased by the first purchaser from a second merchant, storing the data indicative of one or more products purchased by the first purchaser from the second merchant, and providing the first purchaser access to the stored data associated with the first purchaser. The example method further includes receiving a third transaction record including electronic data indicative of one or more products purchased by a second purchaser from a third merchant, storing the data indicative of one or more products purchased by the second purchaser from the third merchant, receiving a fourth transaction record including electronic data indicative of one or more products purchased by the second purchaser from a fourth merchant, storing the data indicative of one or more products purchased by the second purchaser from the fourth merchant, and providing the second purchaser access to the stored data associated with the second purchaser. The first transaction record and the second transaction record include data indicative of the first purchaser; and the third transaction record and the fourth transaction record include data indicative of the second purchaser. Transaction records can be based on all types of transactions, including, but not limited to, local transactions between the purchasers and merchants.

According to one particular method, the transaction records are received from POS systems employed by the merchants. Optionally, the transaction records are received via the purchasers. As yet another option, the transaction records are received from account providers (e.g., credit card companies, banks, etc.) that provide the purchasers with accounts that fund the transactions.

In one method where the transaction records are received via the purchasers, the step of storing the transaction records include storing the transaction records in a mobile handheld device of a purchaser, and the step of receiving a transaction record includes receiving a short-range wireless signal indicative of the transaction record. The method further includes communicating electronic data indicative of the transaction record data from the mobile handheld device to an external system. Examples of external systems include, but are not limited to, a personal computer, an internetwork, systems provided by financial institutions (e.g., credit card companies, banks, etc.), and systems provided by third-party purchase tracking service providers.

Method for providing services to purchasers are also disclosed. One example method includes providing services to purchasers based on transaction records associated with the respective purchasers. The example method includes establishing an Internet connection with a purchaser and providing the services to the purchaser via the Internet connection. Optionally, the method includes accessing a product information source and providing product information related to at least one product associated with a transaction record to the purchaser A method of targeted advertising is also disclosed. An example method includes receiving a plurality of advertisements provided by at least one advertisement source, storing the advertisements, selecting an advertisement based on at least one transaction record, displaying the selected advertisement to a purchaser associated with the transaction record through an Internet connection.

A method implemented in a POS system is also disclosed. An example method includes receiving product data indicative of a first product being sold to a first purchaser in a local transaction, generating a first transaction record, storing the first transaction record, and providing electronic data indicative of the first transaction record to the first purchaser. The first transaction record includes the data indicative of the first product. The electronic data can be provided to the first purchaser via a wired connection or transmitted wirelessly using, for example, a short-range wireless signal to a purchaser's device. The data is then stored on the purchaser's device for later transmission to a purchase tracking database, or saved directly into a purchase tracking database on the purchaser's device. When the data is transmitted to a purchase tracking database, the data is, optionally, augmented to include data indicative of the identity of the purchaser or an account associated with the purchaser.

Optionally, the POS system receives electronic data indicative of the purchaser from, for example, the purchaser. Then, the step of generating a transaction record includes associating the electronic data indicative of the purchaser with the data indicative of the product. Obtaining the identifying information from the purchaser is useful where the POS system transmits the transaction record directly to a remote purchase tracking service provider or a financial institution (e.g., a bank, a credit card company, and so on) that provides purchase tracking services. The remote purchase tracking database can then provide purchase tracking and/or other services to the purchaser based on the transaction records associated with the purchaser.

BRIEF DESCRIPTION OF THE DRAWINGS

The present invention is described with reference to the following drawings, wherein like reference numbers denote substantially similar elements.

DETAILED DESCRIPTION

The present invention overcomes the problems associated with the prior art, by providing a system and method for accumulating and using transaction information associated with transactions made by a purchaser. In the following description, numerous specific details are set forth (e.g., example data structures, communication means, etc.) in order to provide a thorough understanding of the invention. Those skilled in the art will recognize, however, that the invention may be practiced apart from these specific details. In other instances, details of well known retail sales and financial institution practices (e.g., credit card charge approval process) and components (cash register operation) have been omitted, so as not to unnecessarily obscure the present invention.

Figure 1:
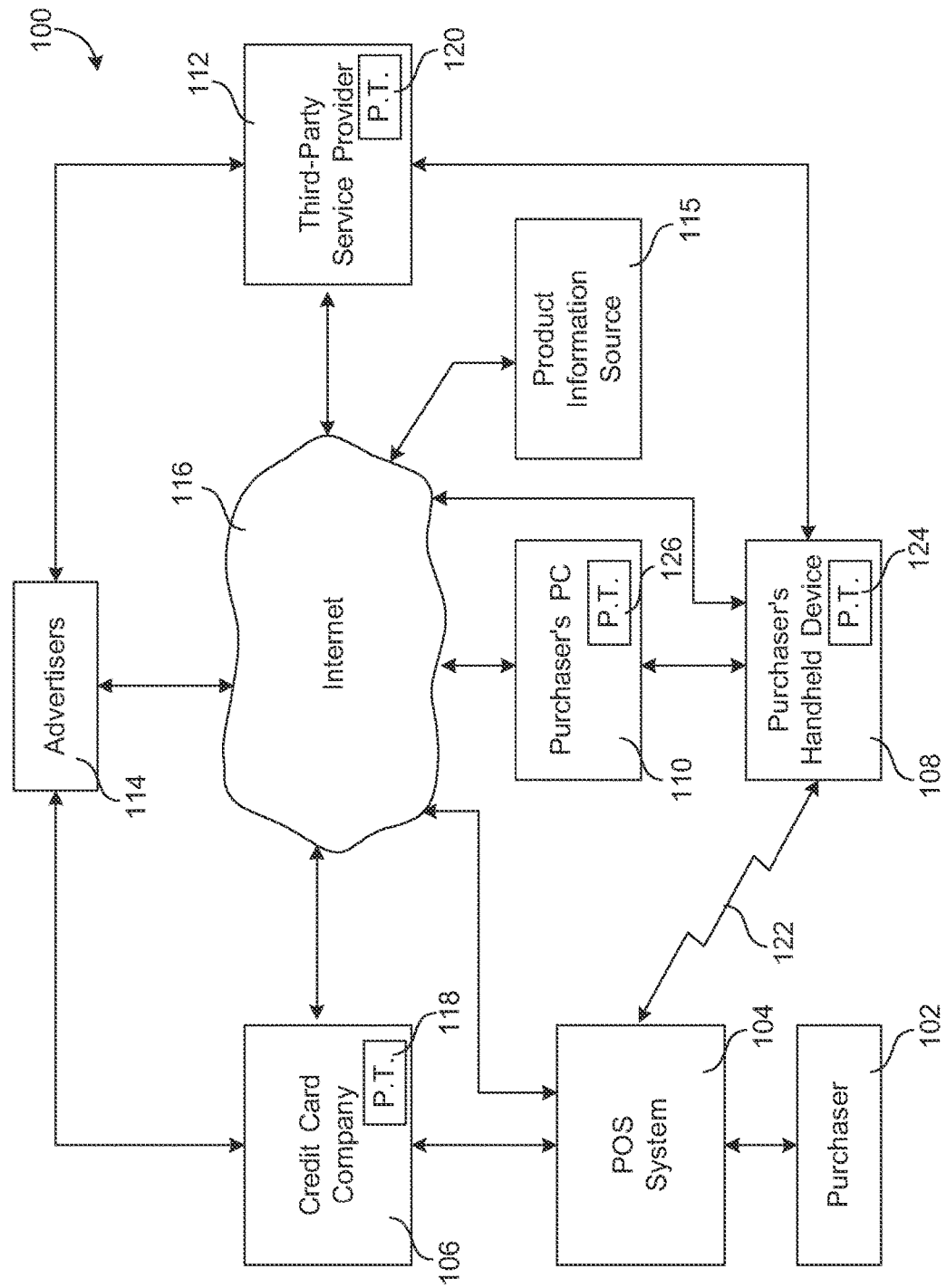
FIG. 1 is a block diagram of a system for accumulating and using transaction records associated with a purchaser.

FIG. 1 shows a system 100 for accumulating, storing, and providing detailed transaction information to a purchaser 102. System 100 includes a POS (point-of-sale) system 104, a credit card company 106, a purchaser's handheld device 108, a purchaser's personal computer (PC) 110, a third-party service provider 112, advertisers 114, and a product information source 115, all intercommunicating via an internetwork 116. Note that internetwork 116 could include any type communication network (e.g., the Internet, telecom system, etc.)) and is, therefore, representative in character only.

In this particular embodiment, POS system 104 (e.g., an electronic cash register) facilitates local transactions between a merchant and various purchasers. During a transaction, purchaser 102 provides POS system 104 with information including a product identifier (e.g., a SKU number) and an account identifier (e.g., credit card numbers, debit card number, check number, etc.). The product identifier uniquely identifies a product which purchaser 102 is purchasing from the merchant. The account identifier uniquely identifies an account associated with purchaser 102, which will fund the transaction. As another example, the account identifier could be a purchaser identification card that includes data uniquely identifying the associated purchaser or purchaser account. As will be described, such alternative means for identifying the purchaser provides advantages when a transaction is paid for using cash or some other non-account-based method (e.g., barter, exchange, etc.). POS system 104 then sends a transaction approval request (TAR) to credit card company 106 and waits for either a denial or an approval. Once POS system 104 receives an approval from credit card company 106, POS system 104 transmits transaction information to credit card company 106. The transaction information includes data associating the product identifier with the account identifier. Optionally, this data can be sent with the original TAR.

Once credit card company 106 receives the transaction information, credit card company 106 stores the transaction information into a purchase tracking database 118, which is operative to store various transaction records uniquely associated with various purchasers who hold credit card accounts with credit card company 106.

Purchasers holding a credit card account with credit card company 106 can later access their transaction records stored in purchase tracking database 118 via a website provided by credit card company 106. The website also provides other services to purchasers. For example, credit card company 106 could provide the purchaser with an alert informing the purchaser that a previously purchased product is being recalled. Thus, a purchaser could be notified about a contaminated food product, a defective drug, or any other potentially dangerous product. As another example, the purchase tracking database 118 can be used to facilitate various other services including, but not limited to, notifying purchaser 102 that the price of an item purchased exceeds the legally mandated fair trade value of the item. Means for providing such notifications to purchaser 102 can include by any suitable communication method now known or yet to be developed.

Product information source 115 provides item specific information to credit card company 106 to facilitate some of the above-described services. For example, responsive to receiving a product identifier from credit card company 106, product information source 115 communicates detailed information associated with the identified product. The detailed product information can include any information related to the purchased product including, but not limited to, product description, use guidelines, open recalls, pricing information, links to additional sources of information, and so on.

Product information source 115 in FIG. 1 represents any source of information accessible to a system hosting a version of the purchase tracking database. In the example shown, these systems include credit card company 106 hosting purchase tracking database 118, purchaser's personal computer (PC) 110 hosting purchase tracking database 126, and third-party service provider 112 hosting purchase tracking database 120. In FIG. 1, the Internet 116 provides communication between product information source 115 and the hosting systems. However, it should be understood that any suitable means of communication with product information source 115 including, but not limited to, a secure direct connection, can be used.

Although product information source 115 is shown representationally in FIG. 1 as a single box, it should be understood that product information source can, in fact, include a wide variety of discrete sources of product information. For example, product information source 115 can include the various manufacturers of products stored in purchase tracking database 118, 120, 126. In addition, product information source 115 can include product retailers, government agencies, consumer groups, and so on.

As a means for generating revenue, credit card company 106 can display advertisements to purchasers based on their transaction history. For example, one or more advertisers 114 will pay credit card company 106 to display their advertisements to purchasers with transaction records indicating that the purchaser has a history of buying products from the advertisers' competitor. As another example, credit card company 106 can display advertisements for accessories for products that a purchaser has already purchased. In general, credit card company 106 can display ads to purchasers based previous purchases using any criteria or relationship thought to provide an increased probability of effectiveness.

Third-party service provider 112 represents a system of an independent company that provides purchase tracking services similar to those provided by the website of credit card company 106, but third-party service provider 112 is not directly involved with the financing of purchasers' transactions. The provided services are based on transaction records of various purchasers stored in a purchase tracking database 120, which is similar to purchase tracking database 118. However, because third-party service provider 112 is not a financial institution involved with financing the transactions between purchasers and merchants, the transaction records stored in purchase tracking database 120 are obtained indirectly from parties involved in the transaction. The parties that can provide transaction records to third-party service provider 112 include, but are not limited to, POS system 104, credit card company 106 and purchaser 102.

POS system 104 is optionally operative to locally communicate transaction information to purchaser's handheld device 108 via, for example, a short range wireless signal 122 or a wired connection (not shown). In this example, the transaction information communicated to purchaser's handheld device 108 includes, at least, a product identifier uniquely identifying each product purchased by purchaser 102 from the merchant employing POS system 104.

In the particular embodiment shown, purchaser's handheld device 108 is a mobile device (e.g., a mobile phone, a personal digital assistant (PDA), etc.) carried by purchaser 102 to automatically capture and store transaction records during transactions, without the need to manually enter such records. Purchaser's handheld device 108 receives the transaction information provided by POS system 104 and then stores it in a purchase tracking database 124 in handheld device 108. In this manner, handheld device 108 can receive and store a multitude of transaction records from a plurality of independent POS systems in purchase tracking database 124. Note that, unlike the transaction information transmitted to credit card company 106, the transaction information transmitted to purchaser's handheld device 108 need not include a purchaser identifier, because purchaser's handheld device 108 would likely be exclusive to purchaser 102. Therefore, purchaser's handheld device 108 can also be used to store transaction information when, for example, purchaser 102 makes purchases with cash rather than with an account-based means (e.g., credit card, debit card, etc.).

Purchaser's handheld device 108 is further operative to communicate with purchaser's PC 110, credit card company 106, and/or third-party service provider 112, either directly or indirectly, through Internet 116. In particular, purchaser's handheld device 108 is operative to receive data from purchaser's PC 110, credit card company 106, and third-party service provider 112 to, for example, update internal software or update transaction information within purchase tracking database 122. Similarly, purchaser's handheld device 108 is operative to provide purchaser's PC 110, credit card company 106, and/or third-party service provider 112 with transaction records stored in purchase tracking database 124. By way of example, a cash transaction record can be communicated from POS system 104 to handheld device 108. Then, at a later time, the cash transaction record can be communicated to third-party service provider 112 or credit card company 106, either directly or via purchaser's PC 110.

Purchaser's PC 110 includes a purchase tracking database 126, which stores transaction information provided by purchaser's handheld device 108, to facilitate further transaction record processes. For example, purchaser 102 can upload transaction records from purchase tracking database 126 to purchase tracking database 118 and/or purchase tracking database 120 to utilize transaction record based services provided by credit card company 106 and/or third-party service provider 112, respectively. Alternatively, the full functionality and services provided by purchase tracking data bases 118 and/or 120 can be implemented in purchase tracking database 126, with optional support from credit card company 106 and/or third-party service provider 112.

Note that purchaser's PC 110 and/or purchaser's handheld device 108 optionally includes a device operative to capture transaction information directly from a paper receipt. For example, purchaser's PC 110 and/or purchaser's handheld device 108 includes a scanner, digital camera, SKU reader, or any other suitable device. The reading device is used in conjunction with suitable pattern recognition software operative to convert the optical pattern into transaction data. Once captured, the transaction information is stored in and/or communicated to one or more of purchase tracking databases 118, 120, 124, and 126 to facilitate the provision of the services described herein.

POS system 104 differs from conventional POS systems in that POS system 104 outputs electronic transaction information to a local user. The electronic transaction information is indicative of specific products, rather than providing only general product description. Likewise, purchase tracking databases 118, 120, 124, and 126 differ from conventional transaction record databases in that the records stored in purchase tracking database 118, 120, 124, and 126 include specific product identifiers, rather than general and/or misleading product descriptions. It is also important to note that POS system 104 is operative to provide specific product information to various financial institutions, rather than just merchant and transaction amount information. Similarly, purchase tracking databases 118, 120, 124, and 126 are operable to store specific product information provided by various independent POS systems and/or any other transaction information sources not specifically shown.

Figure 2:
FIG. 2 is a block diagram depicting data communication between a transaction data source, a purchase tracking database, and the purchaser of FIG. 1.

FIG. 2 shows one example of data flow between a transaction data source 202, purchase tracking database 204, and purchaser 102 (FIG. 1). Transaction data source 202 represents any source (e.g., POS system 104, credit card company 106, etc.), or number of various discrete sources, that provide electronic data indicative of transactions associated with one or more respective purchasers. Purchase tracking database 204 represents any database (i.e., purchase tracking databases 118, 120, 124, and 126) operative to receive and store electronic data indicative of transactions associated with one or more respective purchasers (i.e., purchaser 102).

In this particular example embodiment, transaction data source 202 electronically communicates with purchase tracking database 204 to provide purchase tracking database 204 with data indicative of transactions associated with purchaser 102. Each transaction record includes data indicative of both a purchaser (e.g., credit card number) and at least one product identifier, which uniquely identify the purchaser and the purchased product(s), respectively. Purchase tracking database 204 receives and stores the data provided by transaction data source 202. Purchaser 102 communicates, by some suitable means (e.g., the Internet), with purchase tracking database 204 to access to the transaction records stored therein and services provided thereby. This example dataflow corresponds to a system configuration where the transaction data is provided directly to the purchase tracking database, without being transferred through the purchaser.

It should be noted that purchase tracking database 204 can store transaction records associated with either a single purchaser or multiple purchasers, depending on the particular application. In a case, for example, where purchase tracking database 204 is incorporated into a personal computer belonging to a single purchaser, purchase tracking database 204 would likely only receive transaction records associated with that purchaser. Alternatively, purchase tracking database 204 could be employed by a network based service provider that obtains and provides various purchasers access to their own transaction information. In addition, the combined transaction records of all purchasers can be used, without disclosing the identities of individual purchasers, to provide services (e.g., cost comparison, etc.) to particular purchasers.

Figure 3:
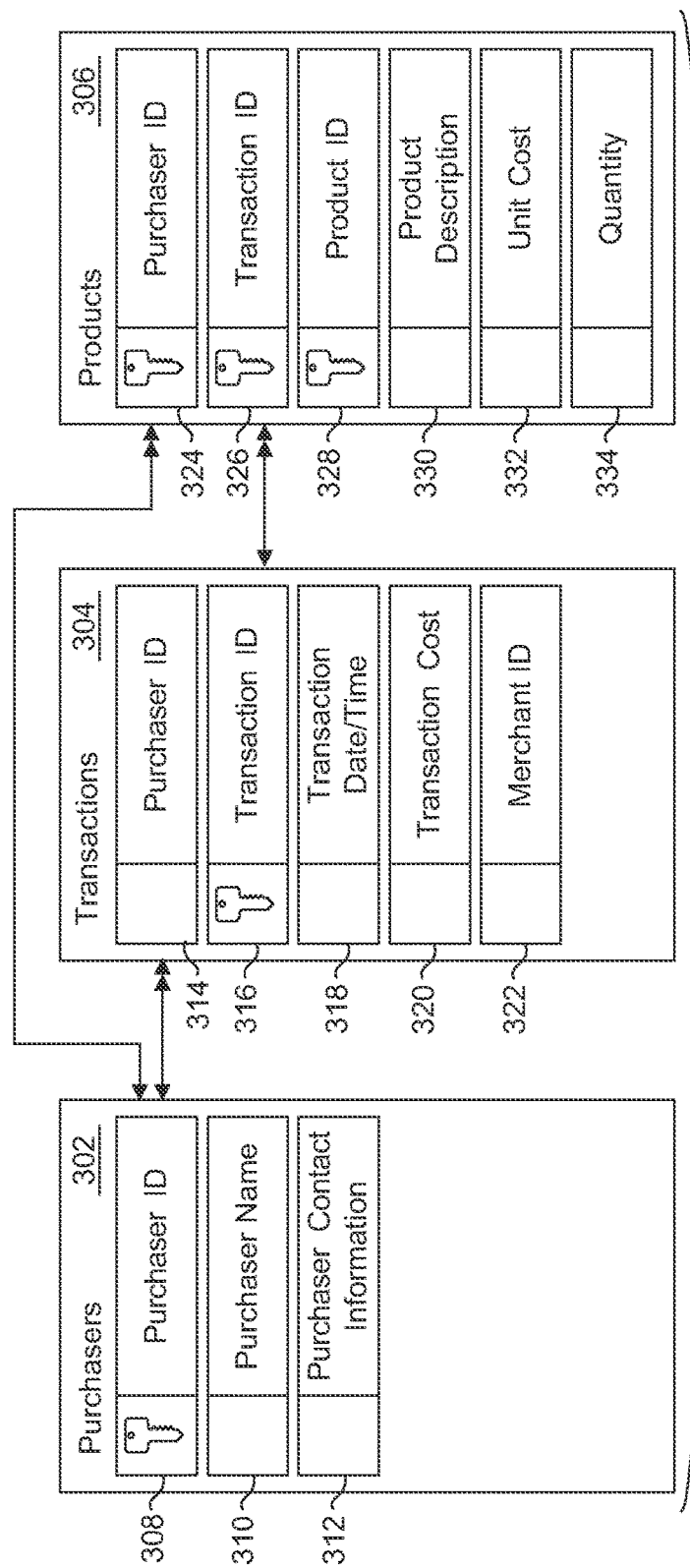
FIG. 3 is a block diagram showing an example data structure for storing data in the purchase tracking database shown in FIG. 2.

FIG. 3 shows an example data structure 300 for storing data in purchase tracking database 204 of FIG. 2. Data structure 300 is a relational database that includes a Purchasers table 302, a Transactions table 304, and a Products table 306. Purchasers table 302 stores a record associated with each purchaser, for example, purchaser 102. Transactions table 304 stores records of transactions made by purchasers identified in table 302. Finally, Products table 306 stores records of information associated with products identified in table 304.

Each record in Purchasers table 302 includes a "Purchaser ID" field 308, a "Purchaser Name" field 310, and a "Purchaser Contact Information" field 312. Purchaser ID field 308 is the key field of Purchasers table 302 and includes data uniquely identifying (e.g., identification number) each purchaser record stored therein. Purchaser Name field 310 stores data indicative of the name of the purchaser associated with Purchaser ID 308. Purchaser Contact Information field 312 stores data indicative of the associated purchaser's contact information (e.g., phone number, email address, etc.).

Each record in Transactions table 304 includes a "Purchaser ID" field 314, a "Transaction ID" field 316, a "Transaction Date/Time" field 318, a "Transaction Cost" field 320, and a "Merchant ID" field 322. Transaction ID field 316 is the key field of Transactions table 304 and includes data uniquely identifying each transaction record stored therein. Purchaser ID field 314 is related to Purchaser ID field 308 of Purchasers Table 302 and associates each record of table 304 with a particular purchaser record of Purchasers table 302. Transaction Date/Time field 318 stores data indicative of the data and time of the associated transaction. Transaction Cost field 320 stores data indicative of the total cost of the associated transaction. Finally, Merchant Information field 322 stores data indicative of a particular merchant (e.g., merchant ID number, name, contact information, location etc.) associated with the transaction.

Each record in Products table 306 includes a "Purchaser ID" field 324, a "Transaction ID" field 326, a "Product ID" field 328, a "Product Description" field 330, a "Unit Cost" field 332, and a "Quantity" field 334. The records of Products table 306 correspond to products that have been purchased by a particular purchaser. Purchaser ID field 324, Transaction ID field 326, and Product ID field 328 are key fields of Products table 306 and, in combination, uniquely identify each record stored therein. Transaction ID field 326 is related to Transaction ID field 316, and associates each record of table 306 with a particular transaction record of Transaction table 304. Product ID field 328 is a product identifier and stores data (e.g., a UPC code) indicative of a particular product. Product Description field 330 stores data describing the product associated with Product ID field 328. Unit Cost field 332 stores data indicative of the associated product's unit cost. Finally, Quantity field 334 stores data indicative of the quantity of associated products purchased.

The records of the tables of data structure 300 are related as follows. Purchaser ID 308 of Purchasers table 302 has a one-to-many relationship with Purchaser ID 314 of Transactions table 302 and with Purchaser ID 324 of Products table 306. That is, there can be many transaction records in Transactions table 304 and many product records in Products table 306 associated with each of the purchaser records of Purchasers table 302. Similarly, Transaction ID 316 of Transactions table 302 has a one-to-many relationship with Transaction ID 326 of Products table 306.

It should be understood that relational database 300 would likely include many more tables than those shown in FIG. 3. For example, Merchant ID field 322 of Transactions table 304 can simply include an identifier associated with a particular merchant, and specific information about the merchant can be stored in records of a separate Merchants table (not shown). However, detailed descriptions of such tables are omitted so as not to unnecessarily obscure the present invention.

Figure 4:
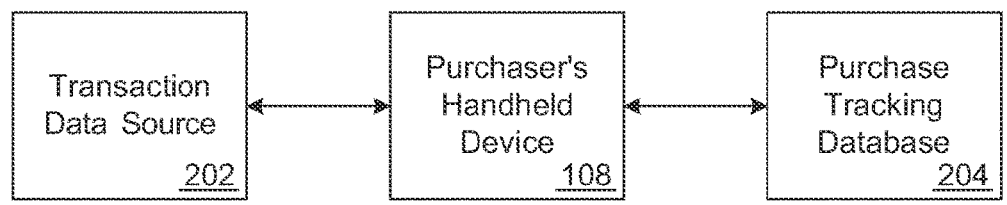
FIG. 4 is a block diagram depicting alternate data communication between a transaction data source, a purchase tracking database, and the purchaser's handheld device of FIG. 1.

FIG. 4 shows another example of data flow between transaction data source 202, a purchaser's device (e.g., handheld device 108 and/or PC 110), and a purchase tracking database 204 (see FIGS. 1 and 2). In this example, the transaction data is communicated indirectly from transaction data source 202 to purchase tracking database 204, via purchaser's handheld device 108 or PC 110. For example, transaction data source 202 communicates directly with purchaser's handheld device 108, to provide purchaser's handheld device 108 with transaction records associated with purchaser 102. Then, purchaser's handheld device 108, responsive to input from purchaser 102, accumulates the transaction records and communicates the accumulated transaction records to purchase tracking database 118 or 120, either directly or via Purchaser's PC 110.

It should be noted that purchaser's handheld device 108 and/or PC 110 can receive the transaction records from transaction data source 202 either locally and/or remotely. For example, during a particular local transaction between purchaser 102 and a merchant, purchaser's handheld device 108 can receive information associated with the transaction directly from POS system 104 via any known local communication technology (e.g., Blue-tooth technology, USB port, etc.). Alternatively, purchaser's handheld device 108 could receive transaction information via any known remote communication technology (cellular technology, Internet connection, etc.). It is important to understand that transaction information locally provided to purchaser's handheld device 108 directly from transaction data source 202 need not necessarily include a purchaser identifier, because purchaser's handheld device 108 would most likely be used only to store transaction information associated with purchaser 102. For example, in a local cash transaction, the merchant POS system would provide purchaser's handheld device 108 with an electronic transaction record (i.e., an electronic receipt) without having to identify purchaser 102, because the transaction information would be directly provided to purchaser 102, either during or immediately after the transaction. However, if the transaction record is remotely provided to purchaser's handheld device 108, the POS system might, but not necessarily, need to obtain a purchaser identifier in order to obtain information such as where to send the transaction information, or who to associate the transaction with. It is also important to understand that the transaction information provided to purchase tracking database 204 from purchaser's handheld device 108 may or may not require a purchaser identifier. When purchase tracking database 204 is used solely by purchaser 102 (e.g., purchase tracking database 124 or 126 in FIG. 1), the transaction information provided to database 204 from purchaser's handheld device 108 need not necessarily include a purchaser identifier. Obviously, the transaction records would require a purchaser identifier in cases where purchase tracking database 204 stores transaction records associated with several purchasers and the data is intended to be manipulated and/or presented based on the purchaser.

Figure 5:
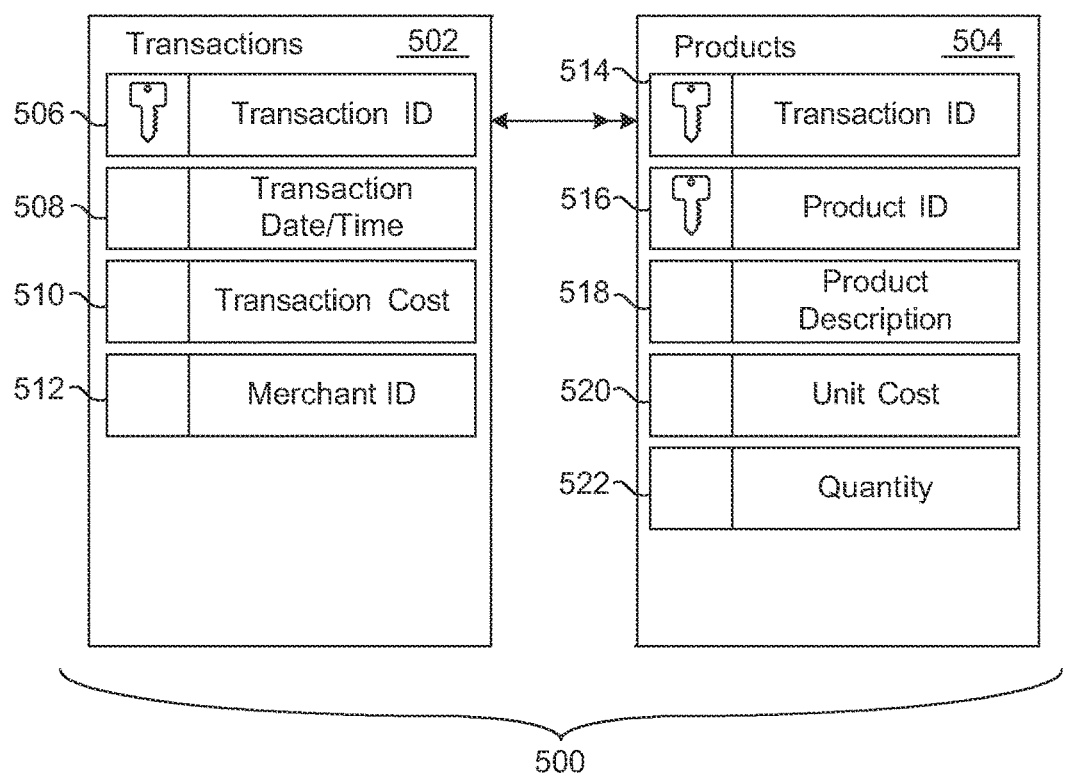
FIG. 5 is a block diagram showing an alternative example data structure for storing data in the purchase tracking database shown in FIG. 4.

FIG. 5 shows an example data structure 500 for storing data in Purchaser's Handheld Device 108. Data structure 500 includes a Transactions table 502, and a Products table 504. Transaction table 502 stores records of information associated with the transactions made by the purchaser employing Purchaser's Handheld Device 108. Products table 504 stores records of products associated with the transactions recorded in table 502.

Each record in Transaction table 502 includes a "Transaction ID" field 506, a "Transaction Date/Time" field 508, a "Transaction Cost" field 510, and a "Merchant Information" field 512. Transaction ID field 506 is a key field of Transaction table 502 and includes data uniquely identifying each transaction record stored therein. Transaction Date/Time field 508 stores data indicative of the time and date of the transaction associated with Transaction ID 506. Transaction Cost field 510 stores data indicative of the total cost of the transaction associated with Transaction ID 506. Merchant Information field 512 stores data indicative of information (e.g., merchant ID number, name, contact information, etc.) about a merchant involved in the transaction associated with Transaction ID 506.

Each record in Products table 504 includes a "Transaction ID" field 514, a "Product ID" field 516, a "Product Description" field 518, a "Unit Cost" field 520, and a "Quantity" field 522. Transaction ID field 514 and Product ID field 516 are, in combination, key fields of Products table 504 and, in combination, uniquely identify each record stored therein. Transactions ID field 514 is related to Transactions ID field 506 of Transactions table 502, and associates each record of table 504 with a particular transaction record of Transactions table 502. Product ID field 516 includes data indicative of a particular product, for example a UPC code. Product Description field 518 stores data indicative of particular features of the product associated with Product ID field 516. Unit Cost field 520 stores data indicative of the product's unit cost. Finally, Quantity field 522 stores data indicative of a quantity of associated products purchased.

Transaction ID field 506 of Transactions table 502 has a one-to-many relationship with Transaction ID field 514 of Products table 504. That is, there can be many product records in Products table 504 associated with each of the transaction records of Transactions table 502.

Figure 6:
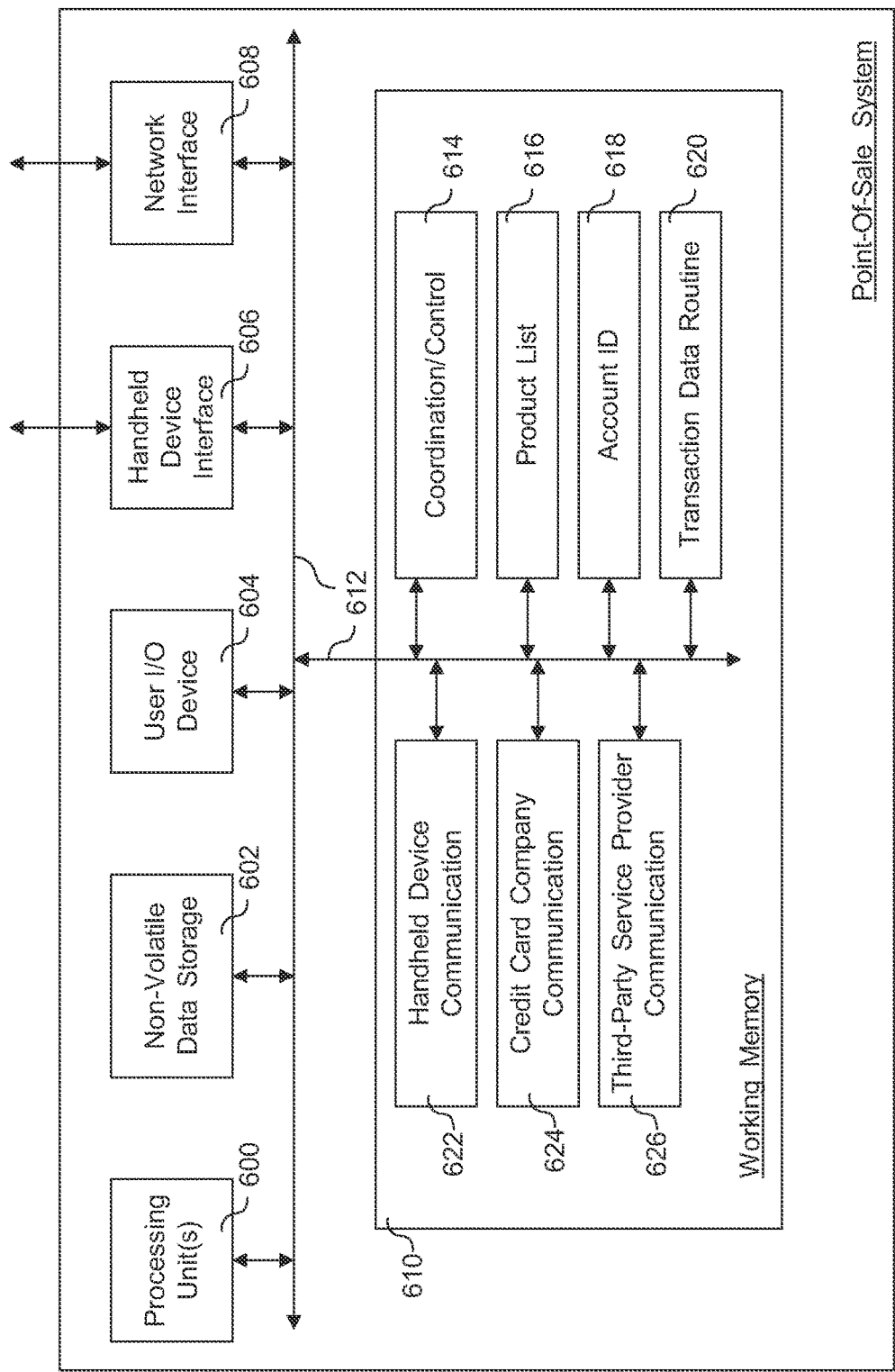
FIG. 6 is a block diagram of the point-of-sale (POS) system shown in FIG. 1.

FIG. 6 is a block diagram showing an example embodiment of POS system 104, which provides transaction information to various systems employing purchase tracking databases, in greater detail. POS system 104 includes one or more processing units 600, non-volatile data storage 602, one or more user input/output devices 604, handheld device interface 606, network interface 608, and a working memory 610, all interconnected via system bus 612.

Processing unit(s) 600 execute(s) data and code stored in working memory 610, causing POS system 104 to carry out its various functions (e.g., providing transaction information, processing transactions, etc.). Non-volatile memory 602 (e.g., read-only memory) provides storage for data and code (e.g., boot code and programs) that are retained even when POS system 104 is powered down. I/O devices 604 facilitate interaction between a system administrator (e.g., cashier) and POS system 104. Handheld device interface 606 provides a connection (e.g., wireless connection, direct electrical connection, etc.) between POS system 104 and various purchaser handheld devices, including purchaser handheld device 108. Network interface 608 provides a connection between POS system 104 and internetwork 116 or some other local or wide area network. Finally, system bus 612 facilitates intercommunication between the various components of POS system 104.

Working memory 610 (e.g., random access memory) provides temporary storage for data and executable code, which is loaded into working memory 610 during start-up and operation. Working memory 610 includes coordination/control module 614, product list module 616, purchaser/account ID module 618, transaction data routine module 620, handheld device communication module 622, credit card company communication module 624, and a third-party communication module 626.

The modules of working memory 610 provide the following functions. Coordination/control module 614 provides coordination and control of the various running program modules. Product list module 616 stores a list of one or more product identifiers associated with respective products being sold during a particular transaction. Purchaser ID module 618 receives and stores a purchaser identifier (e.g., credit card number) which uniquely identifies the purchaser involved with the transaction. Transaction data routine module 620 is operative to formulate a transaction record of the transaction by associating the product identifier(s) stored in product list module 616 with the purchaser identifier stored in purchaser ID module 618. Handheld device communication module 622 facilitates communication between POS system 104 and handheld device 108 carried by the purchaser. Of course, handheld device communication 622 also facilitates communication between POS system 104 and various other handheld devices used by other purchasers. Credit card company communication module 624 facilitates communication between POS system 104 and various credit card companies that provide the purchasers with credit accounts. An example of such communication includes providing the credit card company with transaction approval requests and transaction records associated with transactions funded by the associated credit card company. Third-party service provider communication module 626 facilitates communication between POS system 104 and one or more third-party purchase tracking service providers. An example of such communication includes providing the third-party service provider with transaction records associated with respective purchasers.

Figure 7:
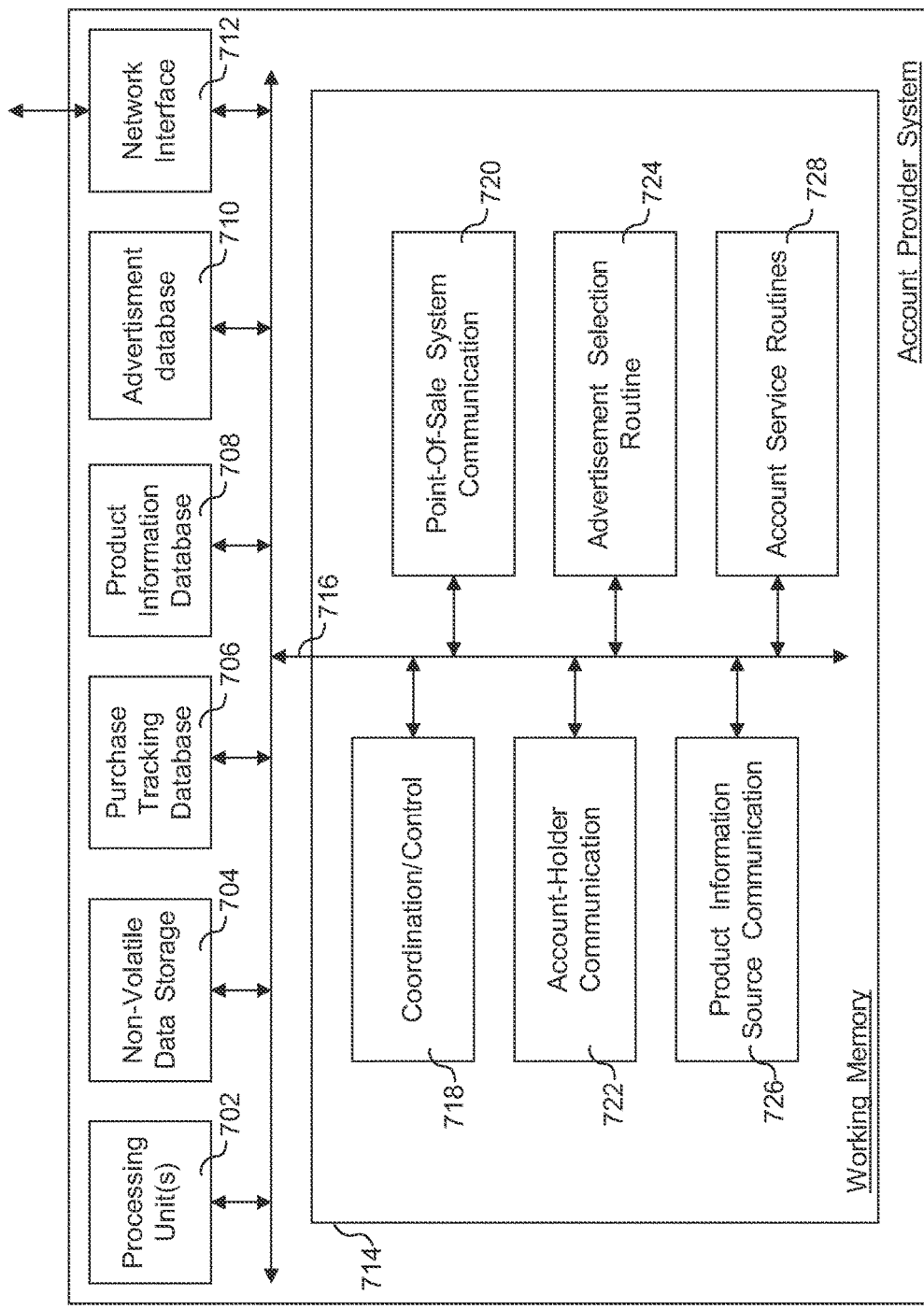
FIG. 7 is a block diagram of an account provider system.

FIG. 7 is a block diagram of an example account provider system 700, representative of credit card company 106 and/or third-party service provider 112. Account provider system 700 includes one or more processing units 702, non-volatile data storage 704, account-holder database 706, product information database 708, advertisement database 710, network interface 712, and a working memory 714, all interconnected via system bus 716. Account provider system 700 represents a system of a service provider that provides purchase tracking services to purchasers holding an account with the account provider. Accordingly, the account provider could also be a financial account provider or could be a purchase tracking service account provider, which is not involved with the funding of associated transactions. For example, account provider system 700 could be hosted by a financial institution (e.g., credit card company, checking account provider, etc.) that provides services based on transaction records directly provided by the merchants whom are associated with the transactions. Alternatively, account provider system 700 could be hosted by a third-party tracking service provider system that provides services based on transaction records received, either directly or indirectly, from any suitable source (e.g., financial institution, merchants, account-holder, etc.). Such services would likely be accessed through a network-based service provider such as an internet website provided by account provider system 700. As another example, such services could be provided through the account-holders cell phone or any other mobile handheld device, personal computer, etc. employed by the account-holder.

Processing unit(s) 702 execute(s) data and code stored in working memory 712, causing account provider system 700 to carry out its various functions (e.g., obtaining transaction information, providing services, communication with associated account-holders, etc.). Non-volatile memory 704 (e.g., read-only memory) provides storage for data and code (e.g., boot code and programs) that are retained even when account provider system is powered down. Purchase tracking database 706 stores records of account-holders (e.g., purchasers, authorizing principals, and so on), transactions, products, etc. as described above with reference to FIG. 3. In addition, information related to services other than purchase tracking, for example financial information related to credit accounts, service information, etc., can be stored in purchase tracking database 706 or stored separately in a database not shown. Product information database 708 stores product information provided by a product information source (e.g., vendors, manufacturers, consumer advocates, governmental agencies, etc.). Such product information includes, but is not limited to, product ingredients, product recalls, product manufacturer contact information, pending litigations, and so on. Advertisement database 710 stores various advertisements, which are to be displayed to account-holders/purchasers based on their transaction records and/or any other information stored in purchase tracking database 706. As an example of choosing which advertisement to display to a particular account-holder, an advertiser could request that account-provider system 700 displays their advertisement(s) (e.g., pop-up add) to account-holders who have a credit limit within a predetermined range. Obviously, such advertising could very accurately target consumers of various demographics, because the displayed advertisements would be chosen according to information (e.g., previously purchased products, credit limit, dates and times of purchases, location of purchases, etc.) directly associated with the account-holder. Accordingly, such advertising would likely serve as an effective means for generating revenue for the account provider. Network interface 712 provides communication between account-provider system 700 and a network such as internetwork 116. Finally, system bus 716 facilitates intercommunication between the various components of account-provider system 700.

Working memory 714 (e.g., random access memory) provides temporary storage for data and executable code, which is loaded into working memory 714 during start-up and operation. Working memory 714 includes a coordination/control module 718, point-of-sale system communication module 720, account-holder communication module 722, advertisement selection routine 724, product information source communication module 726, and an account service routine 728.

The modules of working memory 714 provide the following functions. Coordination/control module 718 provides coordination and control of the various modules and running programs of account-provider system 700. POS system communication module 720 facilitates communication between account-provider system 700 and various POS systems. Such communication includes receiving transaction data and storing transaction records in purchase tracking database 706. Account-Holder communication module 722 facilitates communication between account-provider system 700 and the various account-holders having purchase tracking accounts with the account provider.

Advertisement selection routine module 724 is operative to select and associate (a) particular advertisement(s), stored advertisement database 710, with account-holders based on records stored in purchase tracking database 706. Each advertisement is associated with a predetermined selection criterion for display to an associated account-holder. For example, one predetermined criterion might be that the account-holders must have purchased camping equipment. Of course, it is likely that each account-holder would meet the criteria for more as than can possibly be displayed to a single account-holder. Therefore, each advertisement is assigned a priority level and would be selected prior to ads having a lower priority level. In addition, records indicative of ads previously shown to account holders are stored and used to ensure that the same ad is not unintentionally repetitively shown to a particular user.

In addition, advertisement selection routine is operative to provide communication with advertisers 114 (FIG. 1). This allows advertisers to access and update advertisement database 710. For example advertisers can store new ads, update existing ads, delete existing ads, change ad selection criteria, monitor ad display statistics, and so on.

Product information source communication module 726 facilitates communication between account-provider system 700 and one or more product information source, thereby enabling account-provider system 700 to obtain relevant product information associated with various particular products and store that information in product information database 708. For example, records associating particular ingredients with a particular product can be stored in database 708. As another example, records associating particular products with safety recalls can be stored in database 708. Then, using the transaction records stored in purchasing tracking database 760, account-holder communication module 722 can provide the relevant information in product information database 708 to purchasers that have purchased certain products.

Account service routines module 728 identifies and implements various service routines associated with an account-holder. Such service routines can be identified and executed in real time while the account-holder is communicating with account-provider system 700. As an example, the account-holder can choose to access, sort, and/or filter previously stored transaction records. Such service routines can also be implemented even when the associated account-holder is not logged onto account-provider system 700. For example, some service routines can be initiated and carried out via text message. Service routines could also provide a setting which, when enabled by the account-holder, periodically updates associated product information and provide an alert whenever a previously purchased product requires attention, for example, in the case of a product recall or an exceeded expiration date.

Figure 8:
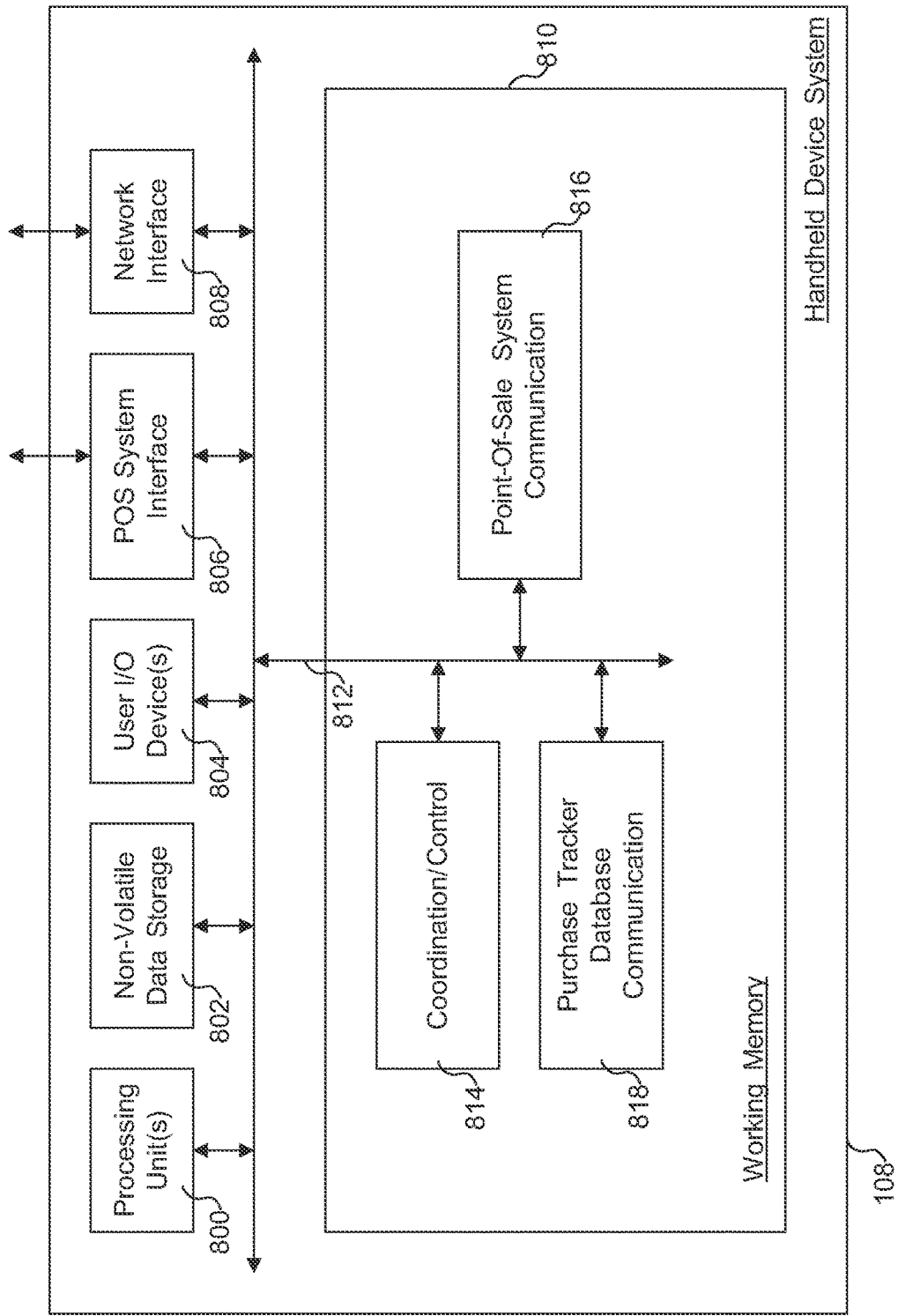
FIG. 8 is a block diagram of the handheld device system shown in FIG. 1.

FIG. 8 is a block diagram of handheld device 108, according to one example embodiment of the present invention. Handheld device 108 includes one or more processing units 800, non-volatile data storage 802, one or more user input/output devices 804, POS system interface 806, network interface 808, and a working memory 810, all interconnected via system bus 812.

Processing unit(s) 800 execute(s) data and code stored in working memory 810, causing handheld device 108 to carry out its various functions (e.g., obtaining transaction records, providing transaction records, etc.). Non-volatile memory 802 (e.g., read-only memory) provides storage for data and code (e.g., boot code and programs) that are retained even when handheld device 108 is powered down. I/O devices 804 facilitate interaction between purchaser 102 and handheld device 108. POS system interface 806 provides a connection (e.g., wireless connection, wired, connection, direct electrical connection, etc.) between handheld device 108 and various POS systems, including POS system 104. Network interface 808 provides a connection between handheld device 108 and internetwork 116. In addition, network interface 808 provides a connection between handheld device 108 and purchaser's PC 110. Finally, system bus 812 facilitates intercommunication between the various components of handheld device 108.

Working memory 810 (e.g., random access memory) provides temporary storage for data and executable code, which is loaded into working memory 810 during start-up and operation. Working memory 810 includes coordination/control module 814, point-of-sale system communication module 816, and a purchase tracking database communication module 818.

The modules of working memory 810 provide the following functions. Coordination/control module 814 provides coordination and control of the various running programs and modules of handheld device 108. Point-of-sale system communication 816 facilitates communication between handheld device 108 and various POS systems including POS system 104. Purchase tracking database communication 818 facilitates communication between handheld device 108 and various systems employing a purchase tracking database. Examples of such systems include, but are not limited to, credit card company 106, purchaser's PC 110, and third-party service provider 112, which employ purchase tracking databases 118, 126, and 120, respectively. In a local transaction with POS system 104 and/or other various POS systems, handheld device 108 receives the locally provided transaction records and then stores the information in non-volatile data storage 802, which stores purchase tracking database 124 (shown in FIG. 1, but not explicitly shown in FIG. 8). This information can then be transferred, either directly or indirectly, to any or all of purchase tracking databases 118, 120, and 126 by any suitable means. It should be noted that purchaser 102 and handheld device 108 need not provide POS system 104 with a purchaser identifier in order to receive a transaction record, because handheld device 108 would most likely be employed only by purchaser 102. Thus, any records stored in handheld device 108 would be transaction records associated with purchaser 102 and/or other purchasers authorized by purchaser 102. Purchase tracker database communication module 818 can, optionally, include a purchaser identifier when the transaction records are communicated to one or more of purchase tracking databases 118, 120, and/or 126. As another option, either one or both of handheld device 108 and purchaser 102 can provide a purchaser identifier to POS systems during a transaction.

Referring again to FIG. 1, system 100 facilitates many applications, aspects, and features, which will now be described. One particular feature includes providing purchaser 102 with services based not only on transaction records associated with purchaser 102, but based also on the transaction records of other purchasers stored in purchase tracking database 120. For example, purchaser 102 can log on to the website provided by third-party service provider 112 to find information related to a particular product(s). Once logged on, purchaser 102 could enter a product ID and a distance purchaser 102 is willing to travel to purchase the product associated with the product ID. Third-party service provider 112 then querys all the transaction records stored in purchaser tracking database 120 for records that fit the predetermined product ID and geographical distance criteria. In other words, third-party service provider 112 would search the transaction records of different purchasers to find which merchants, within the predetermined range, have sold the particular product at the lowest price. Once obtained, the information would be provided to purchaser 102.

The information stored in purchase tracking database 120 is particularly reliable, because the information is based on records of actual transactions. As a multitude of purchasers engage in transactions, purchase tracking database 120 accumulates and stores a large number of transaction records which, together, provide useful product information (e.g., product ID, product costs, product location, etc.) to third-party service provider 112. Indeed, each purchaser having an account with service provider 112 can benefit from all the transaction records of the other purchasers. In addition, this is accomplished without disclosing confidential information associated with one purchaser to another purchaser. Of course, the amount of useful information stored in purchase tracking database 120 is proportional to the number of associated purchasers.

The transaction records stored in purchase tracking database 120 can also used for insurance purposes. For example, during an insurance claim, insurance companies commonly require the claimant provide proof of purchase of a particular good or service in order to recover any damages. Often such proof is simply not available to the claimant. In such a case, records stored in purchase tracking database 120 might provide sufficient proof of purchase for the particular good or service.

Another feature of purchase tracking database 120 is that information from a transaction record can be transferred from one account to another. For example, if a first purchaser purchases a gift for a second purchaser or resells a product to the second purchaser, the first purchaser can have the transaction record transferred from their account to the second purchaser's account. This can be accomplished simply by altering the transaction records of the purchase tracking database to associate the purchased product with the second purchaser. Optionally, the cost field could be hidden from the second purchaser. This feature would provide the second purchaser with a receipt that could be used, for example, to return or exchange a gift.

Another feature provided by third-party service provider 112 includes providing services based on a list (e.g. grocery list) of products assembled by purchaser 102 before participating in a transaction. Purchase tracking database 120 can use transaction information associated with purchaser 102 to augment the analysis of the product list. For example, purchaser 102 can log on to the website hosted by third-party service provider 112 and enter a list of products that purchaser 102 plans on purchasing. The products can be entered into the list by actual product identification or by some other broader classification such as genre. For example, rather than entering an exact product ID (e.g., SKU number) of a specific beverage, purchaser 102 can enter the word "beverage". Third-party service provider 112 then querys purchase tracking database 120 for information related to beverages that purchaser 102 purchased during past transactions. Relevant information is then presented to purchaser 102 in some useful manner, such as updating the product list to include a specific beverage commonly purchased by purchaser 102. As a means to generate revenue, third-party service provider 112 can present purchaser 102 with advertisements based on the products in the list. This enables advertisers 114 to very accurately target potential customers that are already known to have purchased particular products in the past and are now preparing to purchase those or competing products again. Further, this is attractive to advertisers because it minimizes wasted time and effort required for mass advertising to consumers within a particular demographic.

Another feature of system 100 includes the use of a purchase tracker card (PTC) as a means to provide purchase tracker account identification. As an example, the PTC is an identification card having a magnetic strip operative to provide identification data (e.g., the purchaser's purchaser identifier) to POS system 104, when scanned by a merchant. Once POS system 104 receives the identification data from the PTC, POS system 104 establishes a connection with third-party service provider 112 through internet 116 and accesses information related to the account identified by the PTC. During this connection, POS system 104 optionally provides third-party service provider 112 with an updated transaction record associated with the account identified by the PTC.

The use of the PTC also allows purchaser 102 to benefit from the services provided by third-party service provider 112, without requiring any personal information from purchaser 102. For example, a purchaser can obtain a randomly numbered PTC from, for example, a merchant and then activate the PTC account via the Internet. Once activated, purchaser 102 can take advantage of services provided by third-party service provider 112, without ever having to disclose any personal information. Thus, the transaction history is associated with an activated account rather than a particular user. Further, the PTC can also be used during cash or check transactions, because the PTC account need not be involved with the funding of transactions.

The PTC can also be used to present coupons during transactions. For example, when purchaser 102 enters a shopping list in purchase tracking database 120, various advertisements and coupons are offered by advertisers 114. Such advertisements and coupons are provided to purchaser 102, for example, in the form of electronic data stored in purchase tracking database 120. Purchaser 102 presents the coupons for use during a transaction by simply presenting the PTC to POS system 104. Then, when POS system 104 establishes a connection with third-party service provider 112, using the purchaser ID from the PTC, third party service provider 112 provides any coupons associated with the purchaser ID to POS system 104 in digital form, rather than conventional paper form. This feature also simplifies price matching between stores, because many stores honor competitor advertised prices but require the actual printed advertisement. In this case, third-party service provider 112 provides the advertisement in digital form, just as with coupons.

Information stored in purchase tracking database 120 is also useful for merchants and manufacturers. For example, the system facilitates the tracking of digital coupons redeemed by consumers with merchants, which is easier than processing actual paper coupons. Further, electronic coupons are more secure, because dishonest employees cannot reuse or redistribute electronic coupons as they can with paper coupons. Additionally, manufacturers providing the coupons can access data stored in purchase tracking database 120 to verify proper coupon use.

Figure 9:
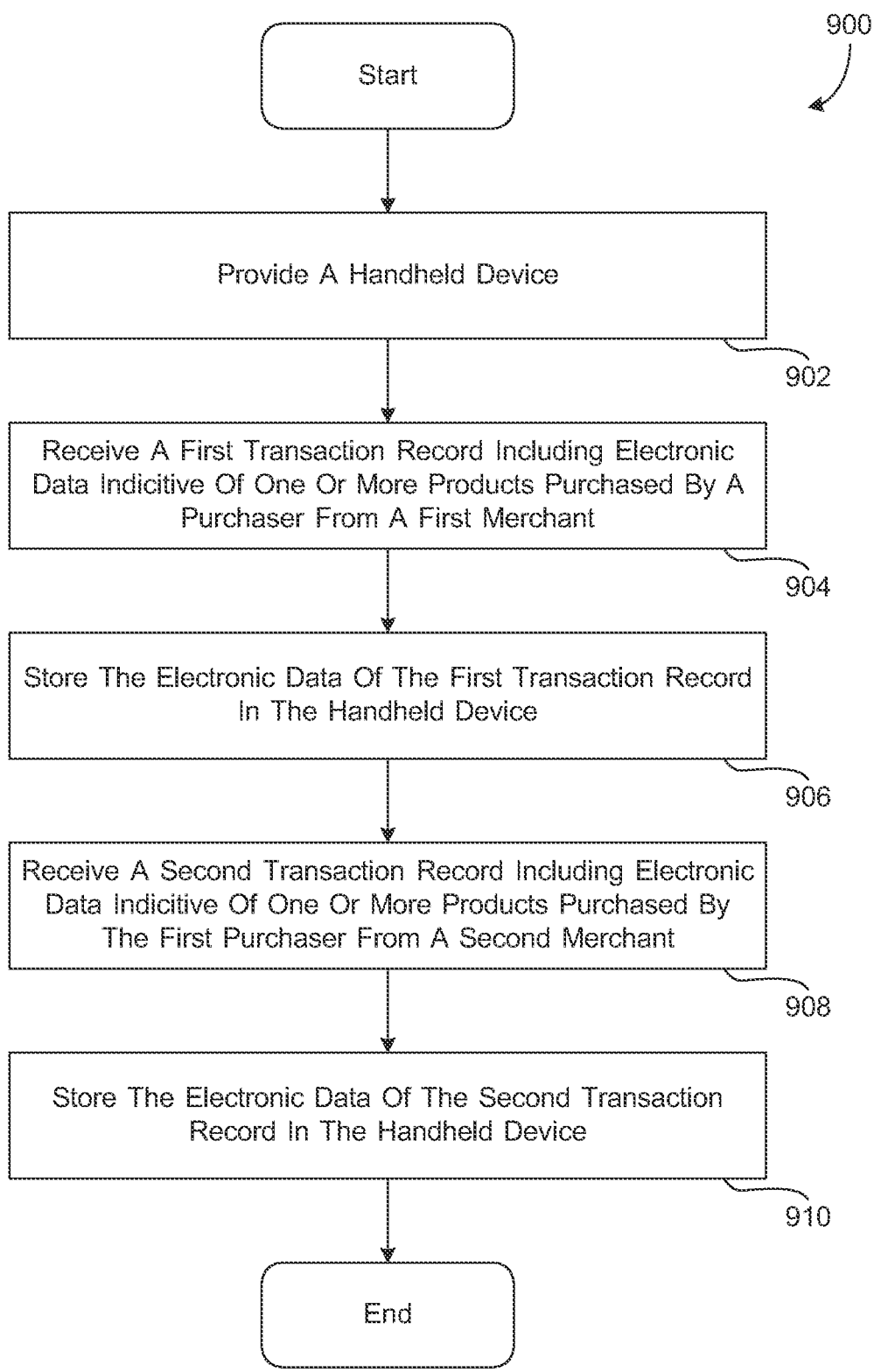
FIG. 9 is a flowchart summarizing a method for obtaining transaction information associated with a purchaser.

FIG. 9 is a flow chart summarizing an example method 900 for obtaining transaction information associated with a purchaser. In a first step 902, a handheld device is provided. Next, in a second step 904, a first transaction record, including electronic data indicative of one or more products purchased by the purchaser from a first merchant, is received. Then, in a third step 906, the electronic data of the first transaction record is stored in the handheld device. Next, in a fourth step 908, a second transaction record, including electronic data indicative of one or more products purchased by the purchaser from a second merchant, is received. Finally, in a fifth step 910, the electronic data of the second transaction is stored in the handheld device.

Figure 10:
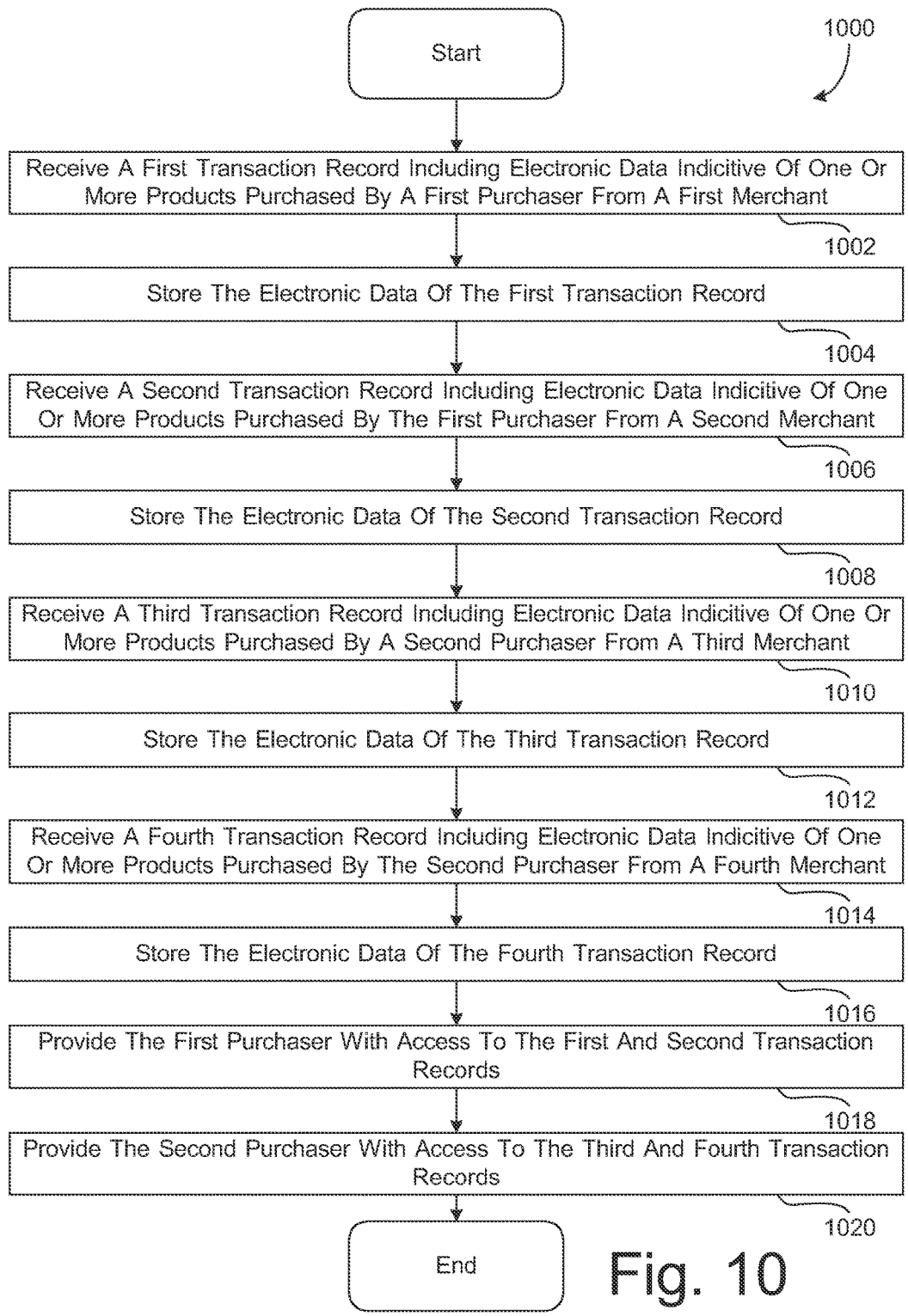
FIG. 10 is a flowchart summarizing a method for obtaining transaction information associated with a plurality of purchasers.

FIG. 10 is a flow chart summarizing one method 1000 for obtaining transaction information associated with a plurality of purchasers. In a first step 1002, a first transaction record, including electronic data indicative of one or more products purchased by a first purchaser from a first merchant, is received. Then, in a second step 1004, the electronic data of the first transaction record is stored. Next, in a third step 1006, a second transaction record, including electronic data indicative of one or more products purchased by the first purchaser from a second merchant, is received. Then, in a fourth step 1008, the electronic data of the second transaction record is stored. Next, in a fifth step 1010, a third transaction record, including electronic data indicative of one or more products purchased by a second purchaser from a third merchant, is received. Then, in a sixth step 1012, the electronic data of the third transaction record is stored. Next, in a seventh step 1014, a fourth transaction record, including electronic data indicative of one or more products purchased by the second purchaser from a fourth merchant, is received. Then, in an eighth step 1016, the electronic data of the fourth transaction record is stored. Next, in a ninth step 1018, access to the first and second transaction records is provided to the first purchaser. Finally, in a tenth step 1020, access to the third and fourth transaction records is provided to the second purchaser.

Figure 11:
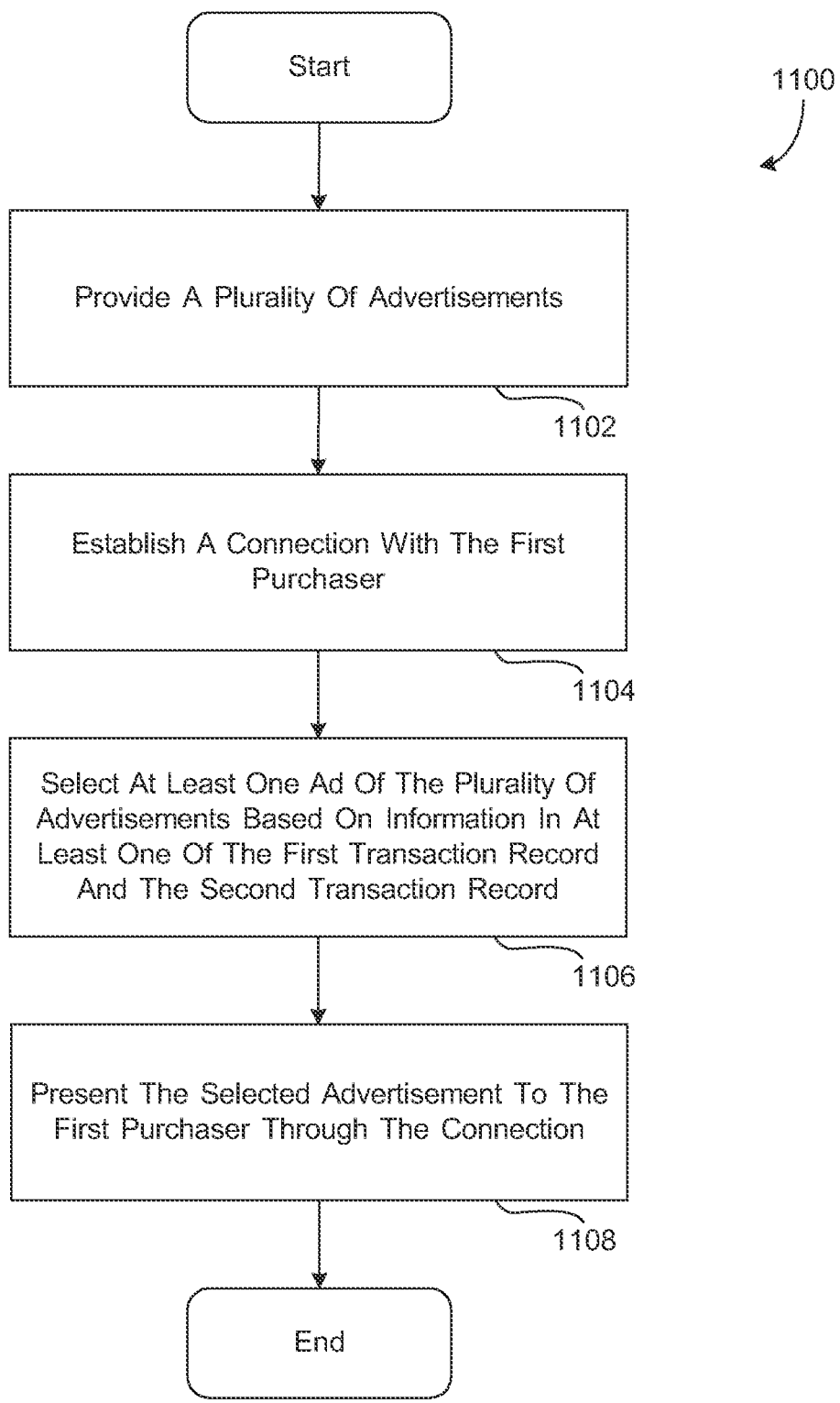
FIG. 11 is a flowchart summarizing an example method for displaying advertisements to purchasers in conjunction with the ninth and or tenth steps (providing access to transaction records) of FIG. 10.

FIG. 11 is a flow chart summarizing a method 1100 for displaying advertisements to the first purchaser, in conjunction with method 1000 of FIG. 10. In a first step 1102, a plurality of advertisements is provided. Next, in a second step 1104, a connection is established with the first purchaser. Then, in a third step 1106, at least one of the plurality of advertisements is selected based on information in at least one of the first transaction record and the second transaction record. Finally, in a fourth step 1108, the selected advertisement is displayed to the first purchaser via the connection.

Figure 12:
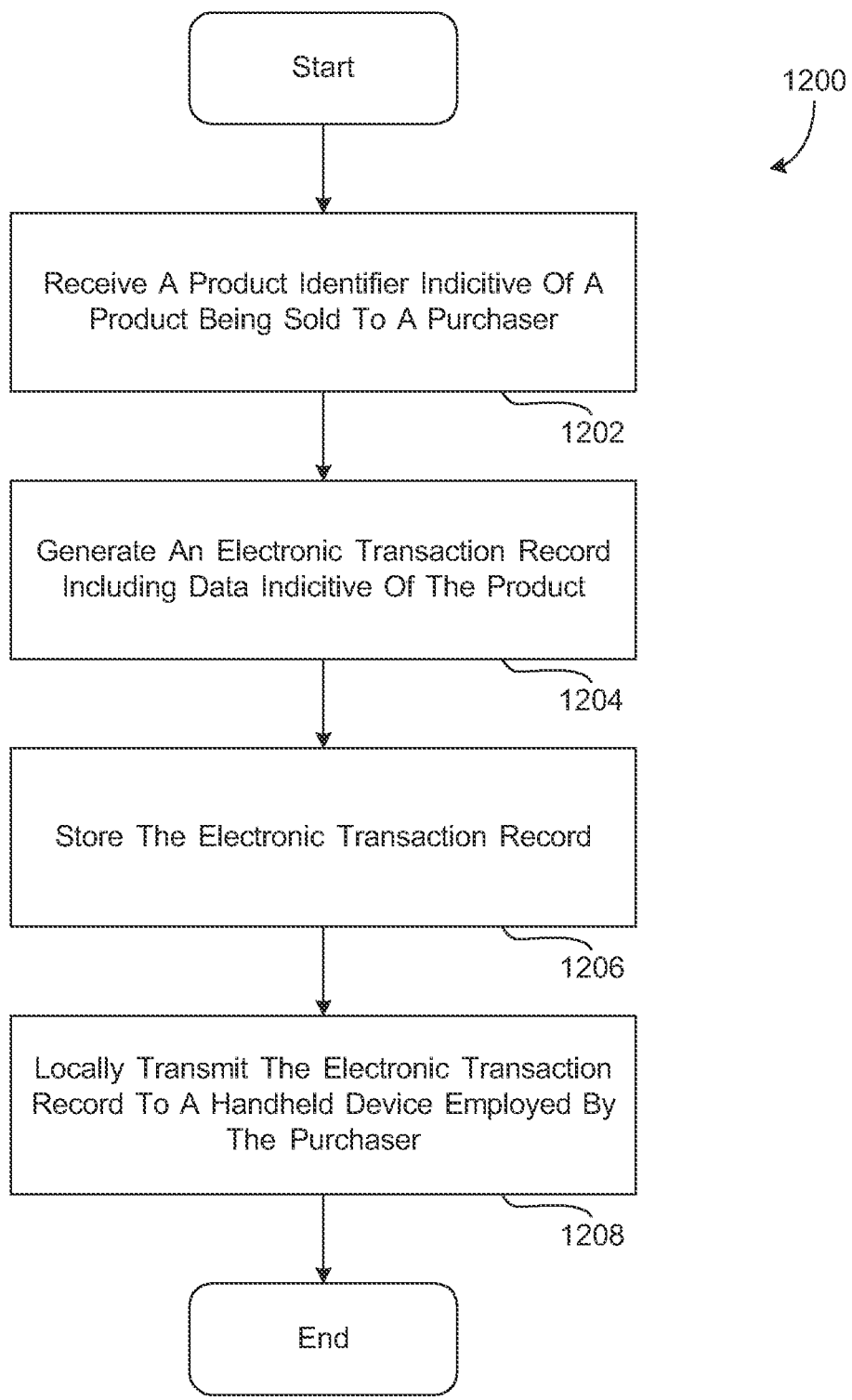
FIG. 12 is a flowchart summarizing an example method for conducting local transactions using a point-of-sale system.

FIG. 12 is a flow chart summarizing a method 1200 for conducting local transactions using a point-of-sale system. In a first step 1202, a product identifier, indicative of a product being sold to a purchaser, is received. Then, in a second step 1204, an electronic transaction record, including data indicative of the product, is generated. Next, in a third step 1206, the electronic transaction record is stored. Finally, in a fourth step 1208, the electronic transaction record is locally transmitted to an electronic device employed by the purchaser, for example a handheld device.

Figure 13:
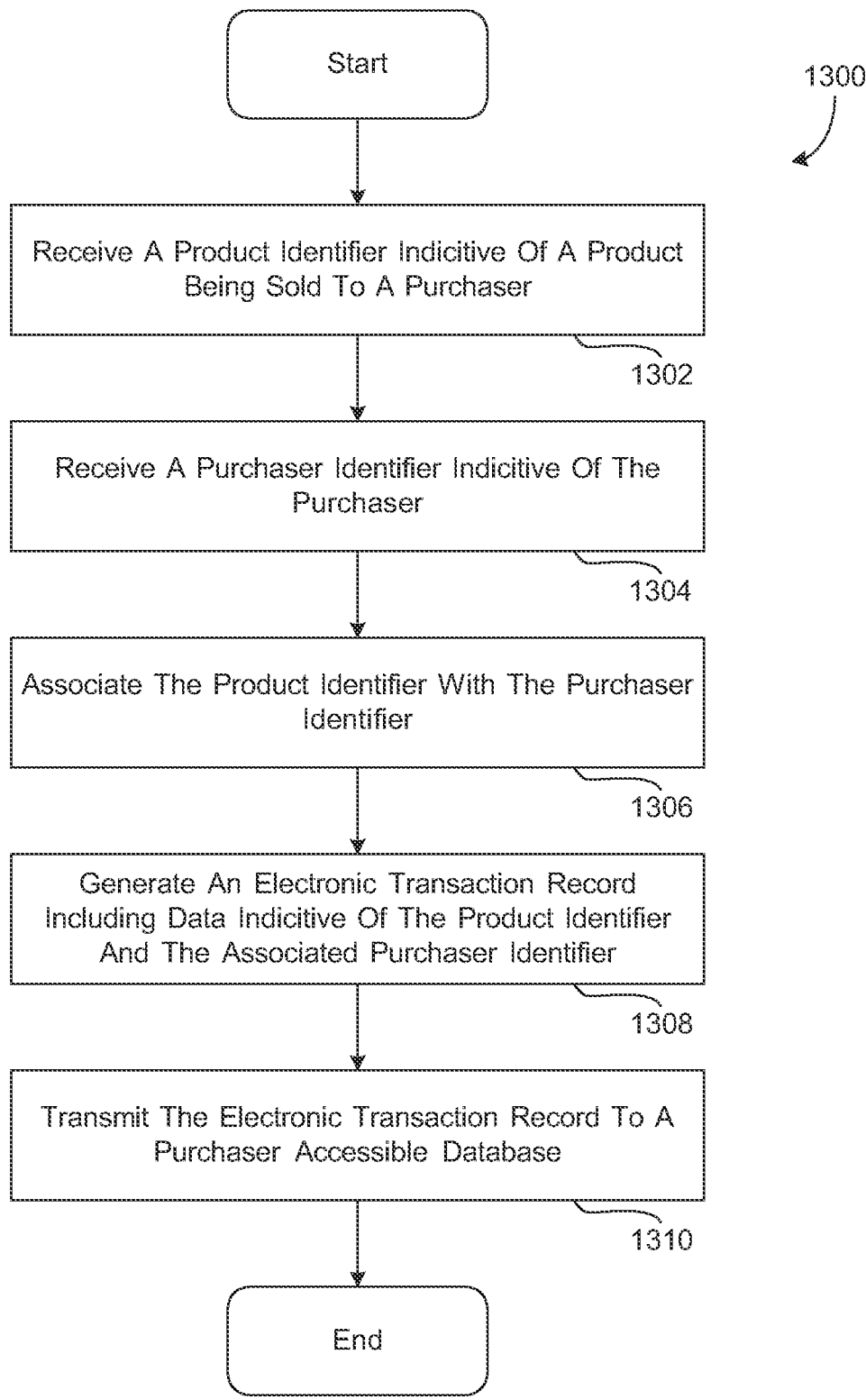
FIG. 13 is a flowchart summarizing an alternative method for conducting local transactions using a point-of-sale system.

FIG. 13 is a flow chart summarizing an alternate method 1300 for conducting local transactions using a point-of-sale system. In a first step 1302, a product identifier, indicative of at least one product being sold to a purchaser, is received. Then, in a second step 1304, a purchaser identifier, indicative of the purchaser, is received. Next, in a third step 1306, the product identifier is associated with the purchaser identifier. Then, in a fourth step 1308, an electronic transaction record, including data indicative of the product identifier and the associated purchaser identifier, is generated. Finally, in a fifth step 1310, the electronic transaction record is transmitted to a database accessible to the purchaser.

Figure 14:
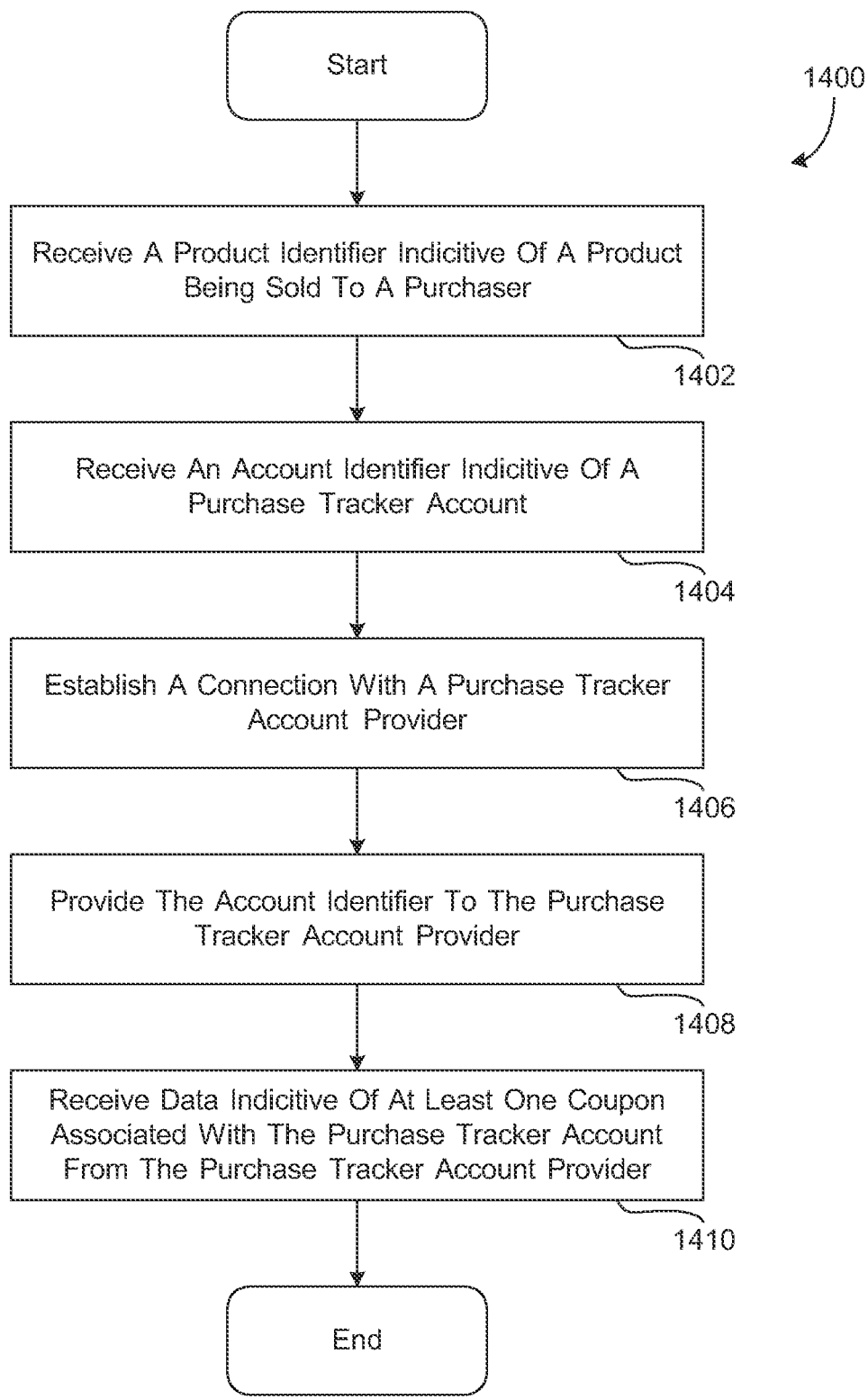
FIG. 14 is a flowchart summarizing another alternative method for conducting local transactions using a point-of-sale system.

FIG. 14 is a flow chart summarizing another alternative method 1400 for conducting local transactions using a point-of-sale system. In a first step 1402, a product identifier indicative of a product being sold to a purchaser is received. Then, in a second step 1404, an account identifier indicative of a purchase tracker account is received. Next, in a third step 1406, a connection with a purchase tracker account provider is established. Then, in a fourth step 1408, the account identifier is provided to the purchase tracker account provider. Finally, in a fifth step 1410, data indicative of at least one coupon associated with the purchase tracker account is received from the purchase tracker account provider.

Figure 15:
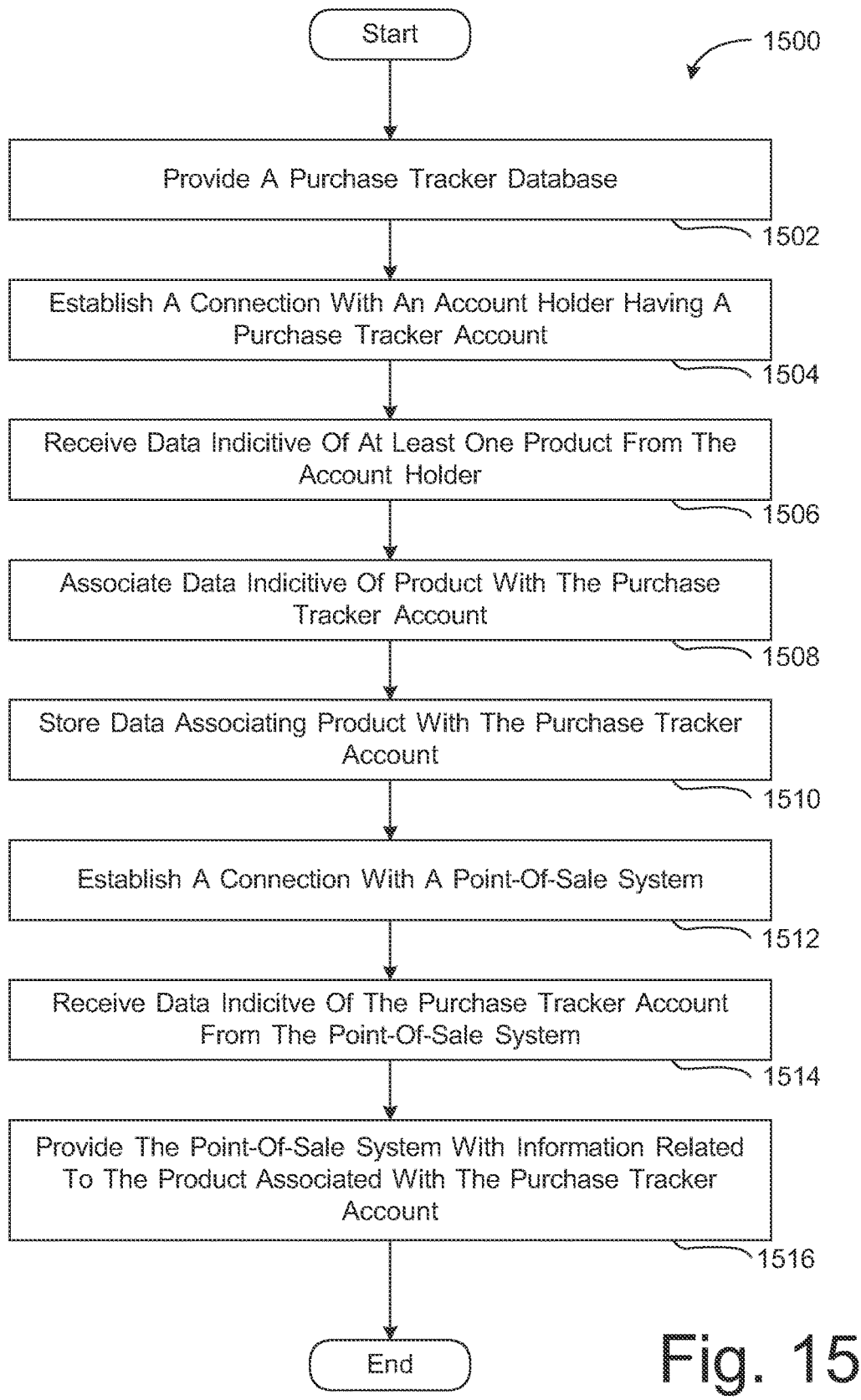
FIG. 15 is a flowchart summarizing a method for providing information to a point-of-sale system.

FIG. 15 is a flow chart summarizing a method 1500 for providing information to a point-of-sale system. In a first step 1502, a purchase tracking database is provided. Then, in a second step 1504, a connection with an account holder having a purchase tracker account is established. Next, in a third step 1506, data indicative of at least one product is received from the account holder. Then, in a fourth step 1508, data indicative of the at least one product is associated with the purchase tracker account. Next, in a fifth step 1510, data associating the data indicative of at least one product with the purchase tracker account is stored. Then, in a sixth step 1512, a connection with a point-of-sale system is established. Next, in a seventh step 1514, data indicative of the purchase tracker account is received from the point-of-sale system. Finally, in an eighth step 1516, the point-of-sale system is provided with information related to the product associated with the purchase tracker account.

The description of particular embodiments of the present invention is now complete. Many of the described features may be substituted, altered or omitted without departing from the scope of the invention. For example, alternate account types (e.g., checking), may be substituted for the credit card accounts shown. As another example, alternate means for remotely transferring data signals to purchasers may be substituted for the short-range wireless means shown. As yet another example, in addition to tracking purchased products and services, the invention can be used to track taxes in general and sales taxes on tracked products and services in particular.

I claim:

1. A system for obtaining transaction information, said system comprising:
   a processing unit operative to process data and code;
   a database including product records associated with completed transactions, each product record associating at least product information, purchase price information, and purchaser information from a completed transaction;
   a transaction record interface operative to
      receive a first transaction record, said first transaction record including data indicative of a first purchaser and one or more products purchased by said first purchaser from a first merchant and
      receive a second transaction record, said second transaction record including data indicative of a second purchaser, one or more products purchased by said second purchaser from a second merchant and of a purchase price paid to said second merchant for at least one of said products;
   a product record storage application operative to
      receive said first transaction record and said second transaction record from said transaction record interface and
      create product records in said database based on said first transaction record and said second transaction record;
   a purchaser interface operative to receive a product information request including information identifying at least one product from said first purchaser; and
   a product service application responsive to said product information request and operative to
      query said database for product records corresponding to said product information request,
      receive returned product records from said database corresponding to said product information request,
      remove said purchaser information from ones of said returned product records associated with said second purchaser such that said second purchaser remains anonymous to said first purchaser to create anonymous product purchase records including said purchase price information for said at least one product identified in said product information request, and
      provide said anonymous product purchase records to said first purchaser via said purchaser interface.

2. A system according to claim 1, wherein:
   said transaction record interface is further operative to receive a third transaction record, said third transaction record including data indicative of a third purchaser and one or more products purchased by said third purchaser from a third merchant; and
   said product service application responsive to said product information request is further operative to remove said purchaser information from ones of said returned product records associated with said third purchaser such that said third purchaser remains anonymous to said first purchaser to create said anonymous product purchase records.

3. A system according to claim 1, wherein said transaction record interface is further operative to:
   receive said first transaction record from a first point-of-sale system employed by said first merchant; and
   receive said second transaction record from a second point-of-sale system employed by said second merchant.

4. A system according to claim 1, wherein said transaction record interface is further operative to:
   receive said first transaction record from said first purchaser; and
   receive said second transaction record from said second purchaser.

5. A system according to claim 1, wherein said transaction record interface is further operative to:
   receive said first transaction record from a first account provider, said first account provider being a financial institution providing said first purchaser with a first account, said first transaction being funded by said first account; and
   receive said second transaction record from a second account provider, said second account provider being a financial institution providing said second purchaser with a second account, said second transaction being funded by said second account.

6. A system according to claim 1, wherein said transaction record interface and said purchaser interface are included in a third-party service provider system, said third-party service provider system being operative to provide services to said first purchaser based on at least one of said first transaction record and said second transaction record.

7. A system according to claim 1, wherein said system hosts web-based services through an interactive website, said web-based services being accessible to said first purchaser through said purchaser interface.

8. A system according to claim 7, further comprising:
an advertisement source interface operative to receive advertisements provided by an advertisement source;
memory operative to store said advertisements;
memory operative to store information provided by said first purchaser;
an advertisement selection routine operative to select an advertisement based on information provided by said first purchaser through said purchaser interface; and
an advertisement display routine operative to display said selected advertisement to said first purchaser when said first purchaser connects to said website.

9. A system according to claim 7, further comprising:
an advertisement source interface operative to receive advertisements provided by an advertisement source;
an advertisement database operative to store said advertisements;
an advertisement selection routine operative to select an advertisement based on at least one of said first transaction record and said second transaction record; and
an advertisement display routine operative to display said selected advertisement to said first purchaser when said first purchaser connects to said website.

10. A system according to claim 1, wherein at least a portion of said transaction record interface is included in a mobile handheld device.

11. A system according to claim 1, wherein:
said purchaser interface is further operative to receive a second product information request including information identifying at least one product from said second purchaser; and
said product service application, responsive to said second product information request, is operative to
query said database for product records corresponding to said second product information request,
receive more returned product records from said database corresponding to said second product information request,
remove said purchaser information from ones of said more returned product records associated with said first purchaser such that said first purchaser remains anonymous to said second purchaser to create more anonymous product purchase records including said purchase price information for said at least product identified in said second product information request, and
provide said more anonymous product purchase records to said second purchaser via said purchaser interface.

12. A system according to claim 1, wherein said transaction record interface is operative to receive said first transaction record from a first remote source and receive said second transaction record from a second remote source.

13. A system according to claim 12, wherein:
said first remote source is a device associated with one of said first purchaser and said first merchant; and
said second remote source is a device associated with one of said second purchaser and said second merchant.

14. A system according to claim 1, further comprising:
a network adapter configured to establish network connections with remote entities; and wherein
said transaction record interface is further operative to
receive said first transaction record via a first network connection established with a first remote source, said first transaction record originating from said first merchant and
receive said second transaction record via a second network connection established with a second remote source, said second transaction record originating from said second merchant; and
said purchaser interface is further operative to communicate with said first purchaser via a third network connection established with said first purchaser.

15. A method for obtaining transaction information, said method comprising:
providing a database including product records associated with completed transactions, each product record associating at least product information, purchase price information, and purchaser information from a completed transaction:
receiving, using one or more processing units, a first transaction record, said first transaction record including electronic data indicative of a first purchaser and one or more products purchased by said first purchaser from a first merchant;
receiving, using said one or more processing units, a second transaction record, said second transaction record including electronic data indicative of a second purchaser, one or more products purchased by said second purchaser from a second merchant and of a purchase price paid to said second merchant for at least one of said products;
creating, using said one or more processing units, product records in said database based on said first transaction record and said second transaction record;
receiving, using said one or more processing units, a product information request including information identifying at least one product from said first purchaser;
responsive to said product information request
querying, using said one or more processing units, said database for product records corresponding to said product information request;
receiving, using said one or more processing units, returned product records from said database corresponding to said product information request;
removing, using said one or more processing units, said purchaser information from ones of said returned product records associated with said second purchaser such that said second purchaser remains anonymous to said first purchaser to create anonymous product purchase records including said purchase price information for said at least one product identified in said product information request; and
providing, using said one or more processing units, said anonymous product purchase records to said first purchaser.

16. A method according to claim 15, further comprising:
receiving a third transaction record, said third transaction record including electronic data indicative of a third purchaser and one or more products purchased by said third purchaser from a third merchant;
creating product records in said database based on said third transaction record; and
removing said purchaser information from ones of said returned product records associated with said third purchaser to create said anonymous product purchase records such that said third purchaser remains anonymous to said first purchaser.

17. A method according to claim 15, wherein:
said step of receiving said first transaction record includes receiving said first transaction record from a first point-of-sale system employed by said first merchant; and
said step of receiving said second transaction record includes receiving said second transaction record from a second point-of-sale system employed by said second merchant.

18. A method according to claim 15, wherein:
said step of receiving said first transaction record includes receiving said first transaction record from said first purchaser; and
said step of receiving said second transaction record includes receiving said second transaction record from said second purchaser.

19. A method according to claim 15, wherein:
said step of receiving said first transaction record includes receiving said first transaction record from a first account provider, said first account provider being a financial institution providing said first purchaser with a first account, said first transaction being funded by said first account; and
said step of receiving said second transaction record includes receiving said second transaction record from a second account provider, said second account provider being a financial institution providing said second purchaser with a second account, said second transaction being funded by said second account.

20. A method according to claim 15, further comprising providing a service to said first purchaser based on at least one of said first transaction record and said second transaction record.

21. A method according to claim 20, further including establishing an Internet connection with said first purchaser and providing said service to said first purchaser via said Internet connection.

22. A method according to claim 21, further comprising:
receiving a plurality of advertisements provided by at least one advertisement source;
storing said advertisements;
selecting an advertisement based on at least one of said first transaction record and said second transaction record; and
displaying said selected advertisement to said first purchaser through said Internet connection.

23. A method according to claim 15, further comprising storing said first transaction record in a mobile handheld device.

24. A method according to claim 23, further comprising communicating electronic data indicative of said first transaction record from said mobile handheld device to an external system.

25. A method according to claim 15, further comprising:
receiving a second product information request including information identifying at least one product from said second purchaser;
responsive to said second product information request, querying said database for product records corresponding to said second product information request;
receiving more returned product records from said database corresponding to said second product information request;
removing said purchaser information from ones of said more returned product records associated with said first purchaser such that said first purchaser remains anonymous to said second purchaser to create more anonymous product purchase records including said purchase price information for said at least one product identified in said second product information request; and
providing said more anonymous product purchase records to said second purchaser.

26. A non-transitory, electronically-readable storage medium having code embodied thereon for causing an electronic device to:
provide a database including product records associated with completed transactions, each product record associating at least product information, purchase price information, and purchaser information from a completed transaction;
receive a first transaction record, said first transaction record including electronic data indicative of a first purchaser and one or more products purchased by said first purchaser from a first merchant;
receive a second transaction record, said second transaction record including electronic data indicative of a second purchaser, one or more products purchased by said second purchaser from a second merchant and of a purchase price paid to said second merchant for at least one of said products;
create product records in said database based on said first transaction record and said second transaction record;
receive a product information request including information identifying at least one product from said first purchaser;
responsive to said product information request, query said database for product records corresponding to said product information request;
receive returned product records from said database corresponding to said product information request;
remove said purchaser information from ones of said returned product records associated with said second purchaser such that said second purchaser remains anonymous to said first purchaser to create anonymous product purchase records including said purchase price information for said at least one product identified in said product information request; and
provide said anonymous product purchase records to said first purchaser.

27. A system for obtaining transaction information, said system comprising:
a processing unit operative to process data and code;
a database including product records associated with completed transactions, each product record associating at least product information, purchase price information, and purchaser information from a completed transaction;
a transaction record interface operative to
receive a first transaction record, said first transaction record including data indicative of a first purchaser and one or more products purchased by said first purchaser from a first merchant and
receive a second transaction record, said second transaction record including data indicative of a second purchaser, one or more products purchased by said second purchaser from a second merchant and of a purchase price paid to said second merchant for at least one of said products;
a product record storage application operative to
receive said first transaction record and said second transaction record from said transaction record interface and
create product records in said database based on said first transaction record and said second transaction record;

a purchaser interface operative to receive a product information request including information identifying at least one product from said first purchaser; and means, responsive to said product information request, for querying said database for product records corresponding to said product information request, for receiving returned product records from said database corresponding to said product information request, for removing said purchaser information from ones of said returned product records associated with said second purchaser such that said second purchaser remains anonymous to said first purchaser to create anonymous product purchase records including said purchase price information for said at least one product identified in said product information request, and for providing said anonymous product purchase records to said first purchaser via said purchaser interface.

\* \* \* \* \*